(12) United States Patent
Nestleroad et al.

(10) Patent No.: US 10,207,333 B2
(45) Date of Patent: Feb. 19, 2019

(54) TOOL ASSEMBLY, SYSTEM, AND METHOD FOR TRANSFERRING LOCATIONS AND DIMENSIONS OF A PATTERN OF HOLES

(71) Applicant: The Boeing Company, Chicago, IL (US)

(72) Inventors: Mark E. Nestleroad, Charleston, SC (US); Craig A. Charlton, Charleston, SC (US); Jake A. Wilson, Charleston, SC (US); Andrew M. Huckey, Charleston, SC (US)

(73) Assignee: The Boeing Company, Chicago, IL (US)

( * ) Notice: Subject to any disclaimer, the term of this patent is extended or adjusted under 35 U.S.C. 154(b) by 306 days.

(21) Appl. No.: 15/236,469

(22) Filed: Aug. 14, 2016

(65) Prior Publication Data

US 2018/0043440 A1 Feb. 15, 2018

(51) Int. Cl.
*B23B 47/28* (2006.01)
*B25H 7/02* (2006.01)

(52) U.S. Cl.
CPC ............ *B23B 47/287* (2013.01); *B25H 7/02* (2013.01); *B23B 2215/04* (2013.01); *B23B 2247/12* (2013.01)

(58) Field of Classification Search
CPC ................................. B23B 47/287; B25H 7/02
USPC .......................................... 33/566, 638, 562
See application file for complete search history.

(56) References Cited

U.S. PATENT DOCUMENTS

| | | | | |
|---|---|---|---|---|
| 2,497,733 A * | 2/1950 | Kebour | ................. | B23B 47/287 408/109 |
| 2,651,951 A | 9/1953 | Altenburger | | |
| 3,008,359 A * | 11/1961 | Mackey | ................ | B23B 47/287 408/115 R |
| 3,381,554 A * | 5/1968 | Ploch | ................... | B23Q 1/4804 33/623 |
| 4,449,867 A | 5/1984 | Dergo | | |
| 4,538,354 A * | 9/1985 | Smolik | ................... | B23B 47/28 33/563 |
| 4,715,125 A * | 12/1987 | Livick | ................... | B23B 47/287 33/197 |
| 5,181,809 A * | 1/1993 | Martin | ............... | G05B 19/4015 33/503 |
| 5,318,394 A * | 6/1994 | Pierce | ................... | B23B 47/287 408/115 B |
| 7,210,880 B2 * | 5/2007 | Snider | ................... | B23B 47/287 408/103 |

(Continued)

*Primary Examiner* — Christopher W Fulton

(57) ABSTRACT

There is provided a tool assembly for transferring locations and dimensions of a pattern of holes from a first structure to a second structure. The tool assembly has a transfer plate with a transfer plate pattern of transfer plate holes that include a plurality of oversize holes and two transfer plate index holes. The transfer plate pattern is substantially identical to the pattern in the first structure. The tool assembly has one or more alignment elements installed in the plurality of oversize holes. Each alignment element has a through opening in a coaxial alignment with the oversize hole. The oversize hole allows formation of an alignment variation gap between an exterior of the alignment element and an inner wall of the oversize hole. The tool assembly has one or more holding elements coupled to the transfer plate, each with a central through opening in coaxial alignment with the oversize hole.

20 Claims, 16 Drawing Sheets

(56) References Cited

U.S. PATENT DOCUMENTS

| | | |
|---|---|---|
| 9,108,250 B1* | 8/2015 | Bui .................. B23B 47/28 |
| 9,598,183 B1* | 3/2017 | Kalisz ................ B64C 3/26 |
| 2005/0084344 A1* | 4/2005 | Dods ............... B23B 47/287 |
| | | 408/67 |
| 2006/0210367 A1* | 9/2006 | Liu ................. B23B 47/287 |
| | | 408/115 R |
| 2007/0098508 A1 | 5/2007 | Dods et al. |
| 2017/0225240 A1* | 8/2017 | Wilson ............. B23B 49/02 |

* cited by examiner

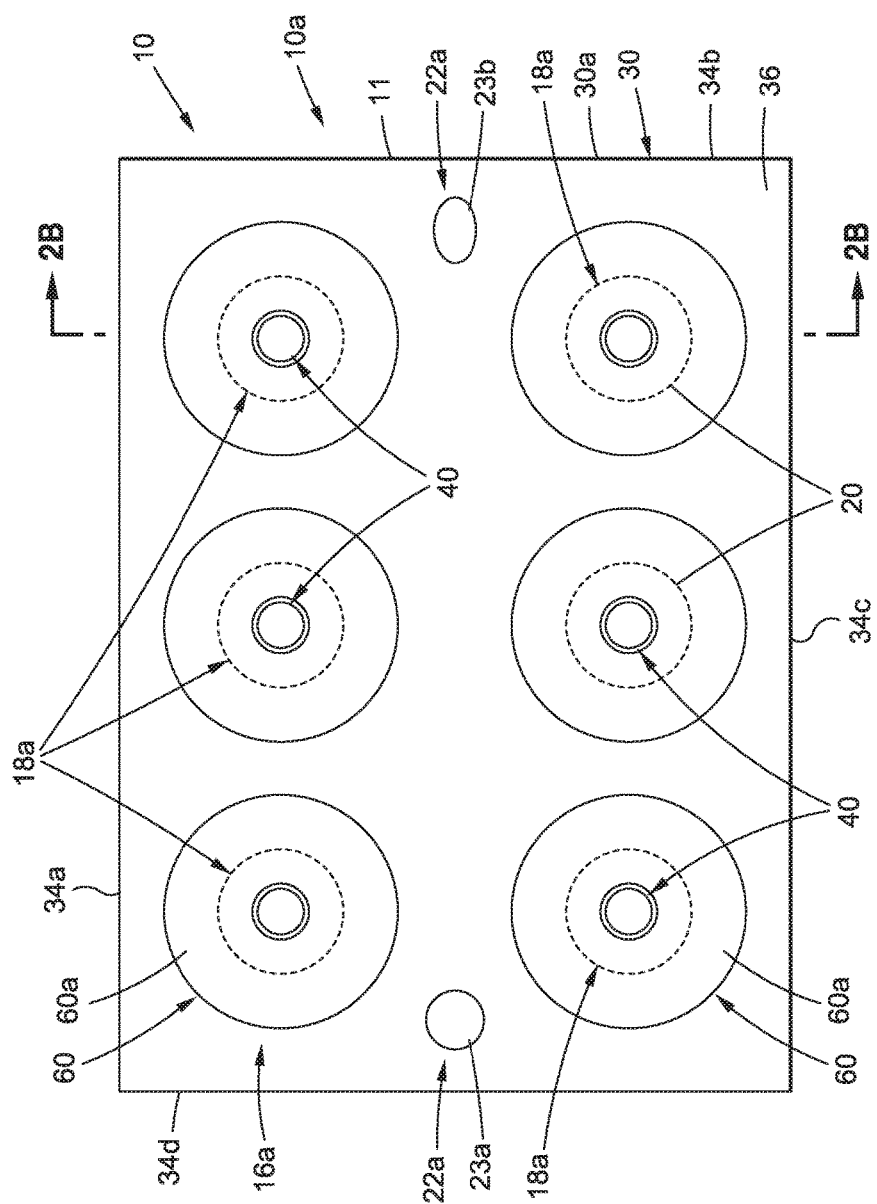

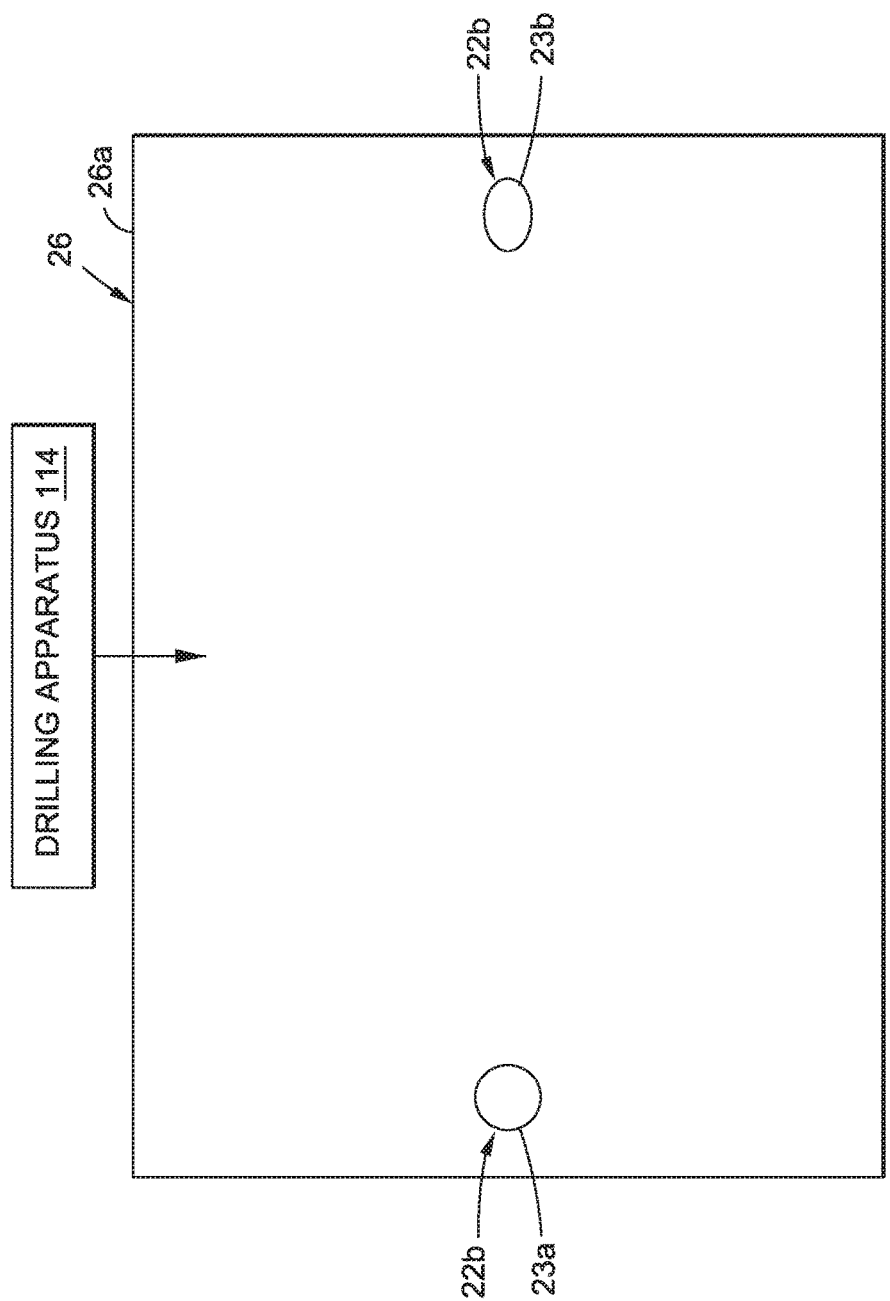

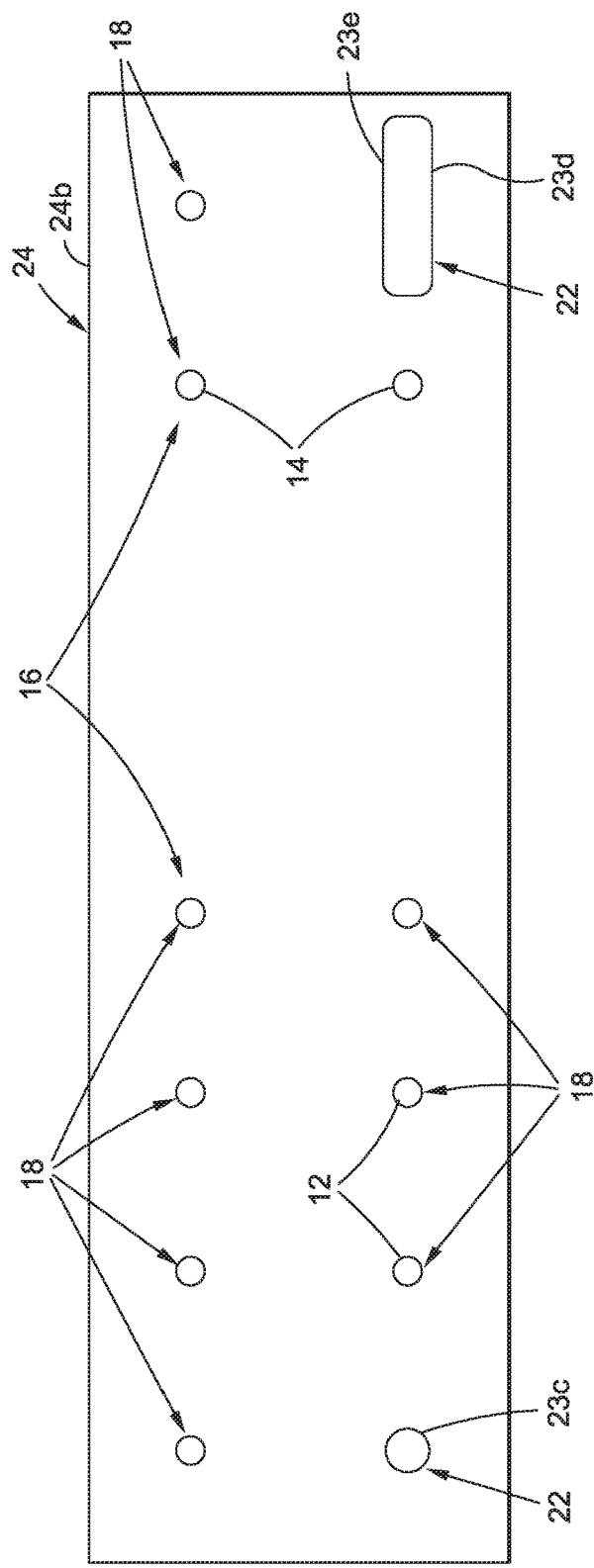

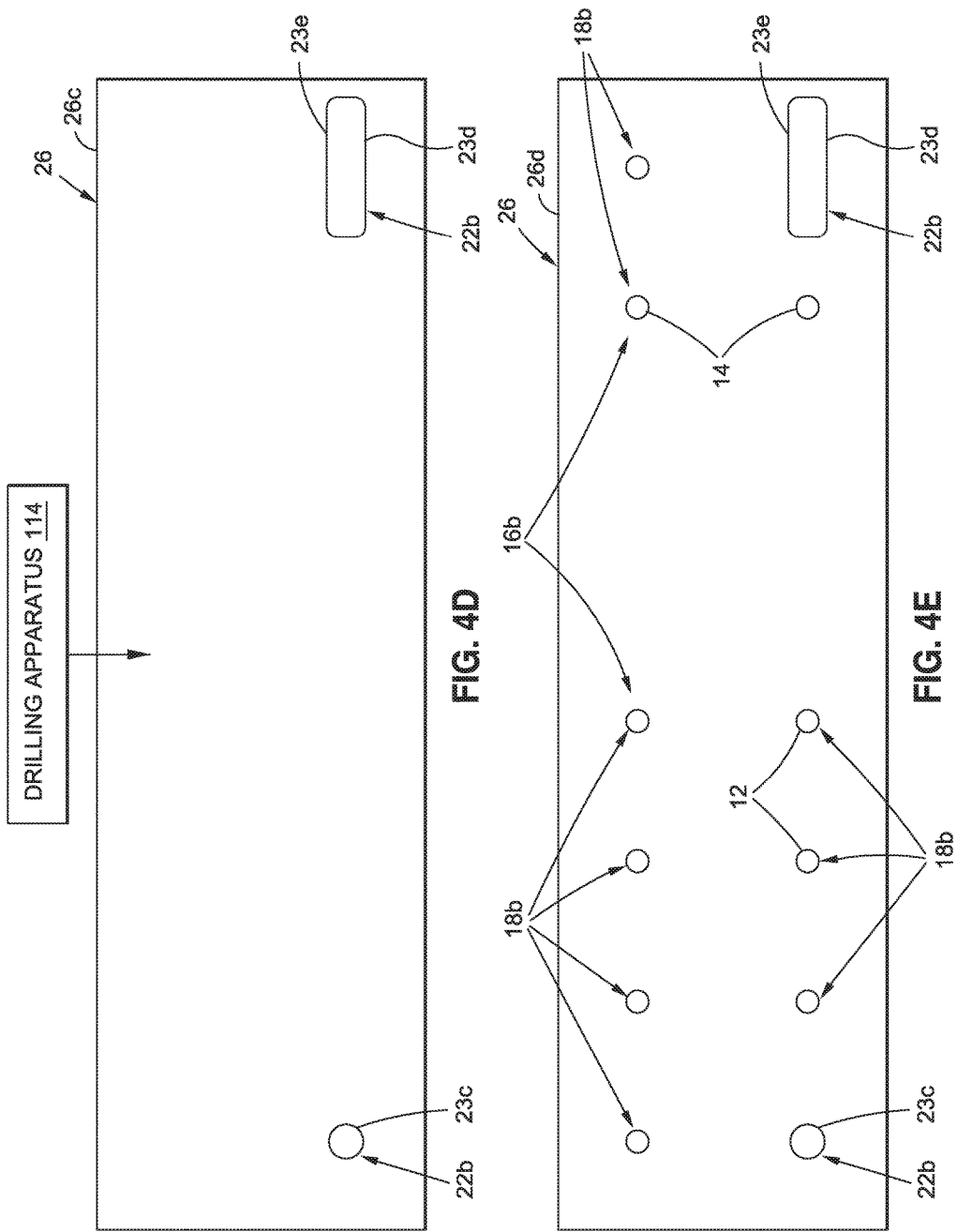

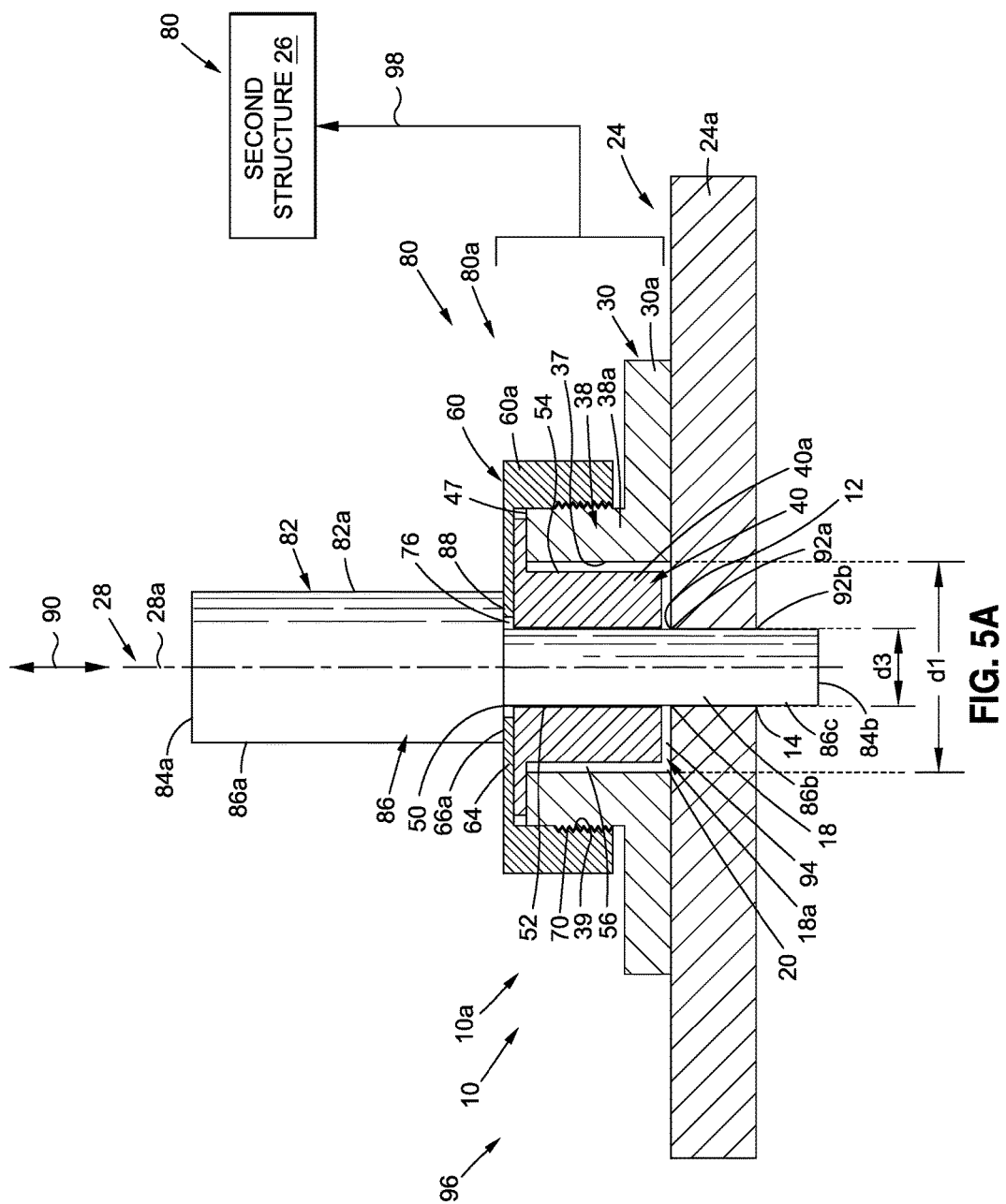

TOOL ASSEMBLY, SYSTEM, AND METHOD FOR TRANSFERRING LOCATIONS AND DIMENSIONS OF A PATTERN OF HOLES

BACKGROUND

1) Field of the Disclosure

The disclosure relates generally to drilling tool assemblies, systems, and methods for the manufacture and assembly of structures, and more particularly, to drilling tool assemblies, systems, and methods for hole pattern duplication of precise locations and dimensions of a pattern of holes in the manufacture and assembly of structures, such as aircraft parts.

2) Description of Related Art

In the aerospace industry, the manufacture and assembly of air vehicles, such as aircraft, may typically include splicing two or more structures or parts together and drilling holes through the spliced structures or parts to accommodate fasteners. In addition, in the repair and replacement of structures or parts of aircraft, it is typically desirable to replicate a drilled hole pattern of an existing part as closely as possible on a new part, in order for the new part to fit with existing parts.

For example, before a pattern of holes is drilled in a structure or part to be assembled or to be replaced in an air vehicle, such as an aircraft, a transfer template or drill jig may be made and positioned on a surface of the structure or part to be drilled. The transfer template or drill jig contains holes conforming to the desired hole pattern that is to be duplicated on the surface of the structure or part to be drilled. A drill is then inserted, typically manually by a drill operator, in each hole of the transfer template or drill jig and is used to drill a hole into or through the structure or part. During duplication of the hole pattern, it is desirable to capture and reproduce the precise locations and dimensions of each hole in accordance with design specifications.

Known transfer templates or drill jigs, and methods of using such known transfer templates or drill jigs, exist. For example, such known transfer templates or drill jigs may typically be installed on the aircraft structure or part and may require match drilling on assembly on the aircraft. However, such match drilling on the aircraft may include subfloor drilling, where drill operators may have to perform drilling operations below their feet, or may include drilling operations in other hard to reach places on the aircraft. This may increase the flow time to complete the drilling, i.e., typically six (6) days, or more, to drill up splice fittings, and may create ergonomic issues for the drill operators.

Moreover, such match drilling on the aircraft may generate debris which may affect sensitive drilling equipment and may result in reliability issues, and which may increase the collection and clean-up costs to remove such debris. Further, the parts requiring such match drilling, such as fittings, may be positioned very close to each other on the aircraft, and it may be difficult to perform simultaneous drilling of these fittings on the aircraft. Also, if there is misalignment of a hole pattern, use of such known transfer templates or drill jigs and methods may take increased time to validate such misalignment.

In addition, known transfer templates or drill jigs exist with fixed drill bushings. However, such fixed drill bushings do not vary the distance between holes in the pattern of holes in the transfer template or drill jig and are limited to the geometry of the transfer template or drill jig itself. This may limit the variation of precise positional tolerances for the pattern of holes, which may, in turn, increase the cost to manufacture or supply such parts having very precise and tight positional tolerances.

In addition, known devices and methods exist for capturing locations and dimensions of hole patterns on parts or structures. For example, manual or computerized coordinate measuring machines (CMMs) may be used to record x, y, and z coordinates of a structure or part and to generate measurement results which can then be analyzed to determine locations and dimensions of hole patterns for drilling onto another part. However, such known CMMs typically require expensive equipment, specialized software, and trained technicians to operate the CMM and to analyze the measurement results. This may increase the complexity, time, and cost of manufacture or assembly of the structure or part. Further, such known CMMs may require evacuating assembly workers off of the aircraft during operation of the CMM in order to maintain a stable test environment to obtain the measurements. This may result in increased setup time and operation, and may, in turn, result in increased time and cost of manufacture or assembly of the structure or part.

Accordingly, there is a need in the art for an improved tool assembly, system, and method for capturing and transferring locations and dimensions of a pattern of holes from a first structure to a second structure, that is fast, reliable, low cost, simple, and easy to use, and that provide advantages over known assemblies, systems, and methods.

SUMMARY

Example implementations of the present disclosure provide an improved tool assembly, system, and method for capturing and transferring locations and dimensions of a pattern of holes from a first structure to a second structure. As discussed in the below detailed description, embodiments of the tool improved assembly, system, and method for capturing and transferring locations and dimensions of a pattern of holes from a first structure to a second structure, may provide significant advantages over existing assemblies, systems, and methods.

In one embodiment there is provided a tool assembly for transferring locations and dimensions of a pattern of holes from a first structure to a second structure. The tool assembly comprises a transfer plate having a transfer plate pattern of transfer plate holes formed through the transfer plate. The transfer plate holes comprise a plurality of oversize holes and at least two transfer plate index holes. The transfer plate pattern is substantially identical to the pattern in the first structure.

The tool assembly further comprises one or more alignment elements installed in the plurality of oversize holes. Each alignment element has a through opening in a coaxial alignment with the oversize hole. The oversize hole allows formation of an alignment variation gap between an exterior of the alignment element and an inner wall of the oversize hole.

The tool assembly further comprises one or more holding elements coupled to the transfer plate. Each holding element has a central through opening in coaxial alignment with the oversize hole of the transfer plate and the through opening of the alignment element. When the tool assembly is coupled to the first structure and a positioning pin is inserted into each through opening of the one or more alignment elements and into each hole of the first structure, the one or more holding elements hold the one or more alignment elements in place against the transfer plate, and the one or more alignment elements are each set at a desired alignment position to capture the locations and the dimensions of the pattern of holes and to provide transfer of the locations and the dimensions of the pattern of holes from the first structure to the second structure.

In another embodiment there is provided a system for transferring locations and dimensions of a pattern of holes from a first structure to a second structure. The system comprises the first structure having the pattern of holes with the locations and the dimensions. The system further comprises a tool assembly.

The tool assembly comprises a transfer plate having a transfer plate pattern of transfer plate holes formed through the transfer plate. The transfer plate holes comprise a plurality of oversize holes and at least two transfer plate index holes. The transfer plate pattern is substantially identical to the pattern in the first structure.

The tool assembly further comprises one or more alignment elements installed in the plurality of oversize holes. Each alignment element has a through opening in a coaxial alignment with the oversize hole. The oversize hole allows formation of an alignment variation gap between an exterior of the alignment element and an inner wall of the oversize hole. The tool assembly further comprises one or more holding elements coupled to the transfer plate. Each holding element has a central through opening in coaxial alignment with the oversize hole of the transfer plate and the through opening of the alignment element.

The system further comprises one or more positioning pins configured for insertion into each through opening of the one or more alignment elements, and into each hole of the first structure. The system further comprises the second structure configured for drilling of the locations and the dimensions of the pattern of holes captured and transferred from the first structure with the tool assembly.

When the tool assembly is coupled to the first structure and the one or more positioning pins are inserted into the one or more alignment elements and into the holes of the first structure, the one or more holding elements hold the one or more alignment elements in place against the transfer plate. The one or more alignment elements are each set at a desired alignment position to capture the locations and the dimensions of the pattern of holes and to provide transfer of the locations and the dimensions of the pattern of holes from the first structure to the second structure.

In another embodiment there is provided a method for transferring locations and dimensions of a pattern of holes from a first structure to a second structure. The method comprises the step of assembling a tool assembly.

The tool assembly comprises a transfer plate having a transfer plate pattern of transfer plate holes formed through the transfer plate. The transfer plate holes comprise a plurality of oversize holes and at least two transfer plate index holes. The transfer plate pattern is substantially identical to the pattern in the first structure. The tool assembly further comprises one or more alignment elements installed in the plurality of oversize holes. Each alignment element has a through opening in a coaxial alignment with the oversize hole. The oversize hole allows formation of an alignment variation gap between an exterior of the alignment element and an inner wall of the oversize hole. The tool assembly further comprises one or more holding elements coupled to the transfer plate. Each holding element has a central through opening in coaxial alignment with the oversize hole of the transfer plate and the through opening of the alignment element.

The method further comprises the step of indexing the tool assembly to the first structure, using the at least two transfer plate index holes aligned with at least two substantially identical corresponding first structure index holes formed in the first structure. The method further comprises the step of coupling the tool assembly to the first structure using the one or more holding elements.

The method further comprises the step of inserting one or more positioning pins into the one or more alignment elements of the tool assembly, and into the holes of the first structure. The method further comprises the step of aligning each alignment element with each hole of the first structure, and setting each alignment element at a desired alignment position. The method further comprises the step of using the one or more holding elements to secure each alignment element in place against the transfer plate, to capture the locations and the dimensions of the pattern of holes of the first structure.

The method further comprises the step of removing the one or more positioning pins from the tool assembly. The method further comprises the step of removing the tool assembly from the first structure. The method further comprises the step of transferring to the second structure, the locations and the dimensions of the pattern of holes captured from the first structure with the tool assembly.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2A is an illustration of a top view of an exemplary embodiment of a tool assembly of the disclosure;

FIG. 3A is an illustration of a top view of an exemplary embodiment of a second structure, prior to drilling, that may be used with the tool assembly, system, and method of the disclosure;

FIG. 4C is an illustration of a top view of another exemplary embodiment of a first structure that may be used with embodiments of the tool assembly, system, and method of the disclosure;

FIG. 4D is an illustration of a top view of another exemplary embodiment of a second structure, prior to drilling, that may be used with the tool assembly, system, and method of the disclosure;

FIG. 4E is an illustration of a top view of the second structure of FIG. 4D, after drilling;

FIG. 5A is an illustration of a partial cross-sectional view of an exemplary embodiment of a system of the disclosure with an embodiment of a tool assembly;

Figure 1:
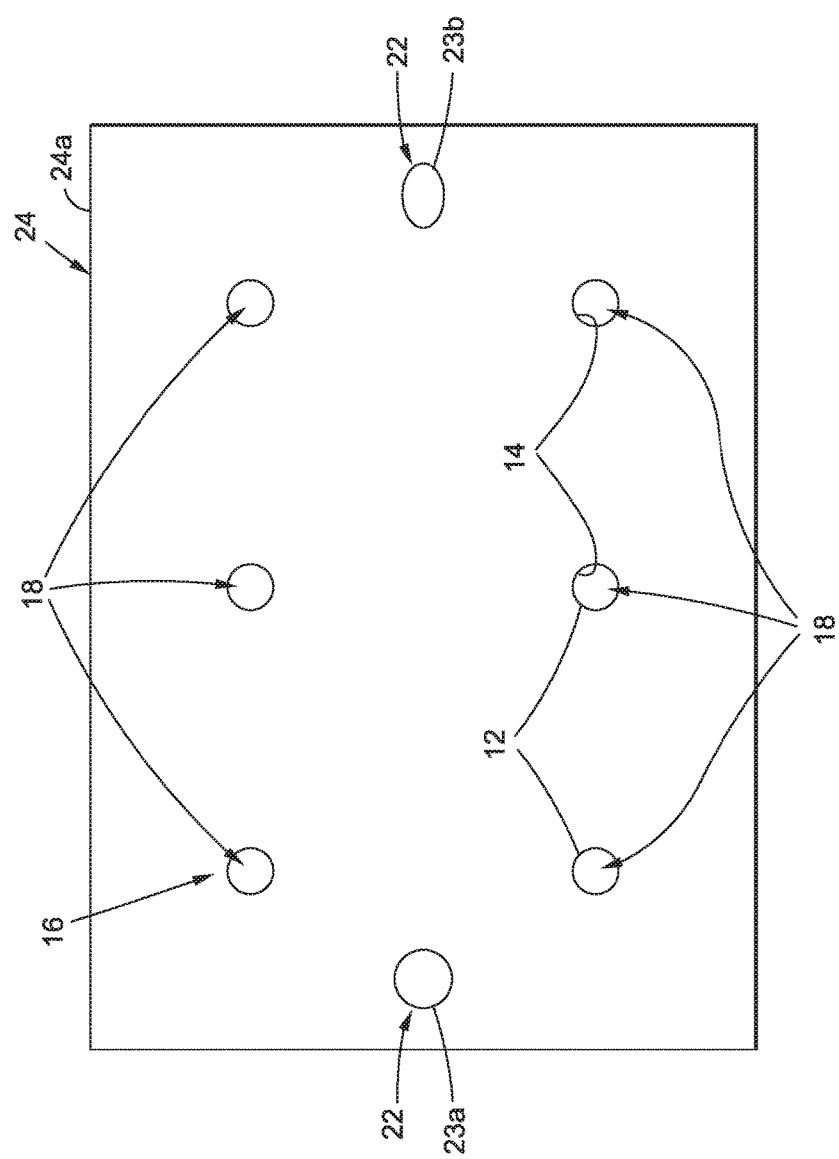
FIG. 1 is an illustration of a top view of an exemplary embodiment of a first structure that may be used with embodiments of the tool assembly, system, and method of the disclosure.

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

The disclosure provides for an improved drill template tool with integral seal. The improved drill template tool with integral seal device of the disclosed embodiments may be used to manufacture composite and metallic parts for use on aircraft, spacecraft, watercraft, and other vehicles and craft. Accordingly, one of ordinary skill in the art will recognize and appreciate that the improved drill template tool with integral seal device of the disclosure can be used in any number of applications involving such vehicles and craft.

Embodiments of a tool assembly 10 (see FIGS. 2A-2B, 4A-4B), a system 80 (see FIGS. 5A-5C), and a method 150 (see FIG. 7), for transferring locations 12 (see FIG. 1) and dimensions 14 (see FIG. 1) of a pattern 16 (see FIG. 1) of holes 18 (see FIG. 1) from a first structure 24 (see FIG. 1) to a second structure 26 (see FIGS. 3A-3B), are disclosed herein. Such locations 12 (see FIG. 1) and dimensions 14 (see FIG. 1) of the pattern 16 (see FIG. 1) of holes 18 (see FIG. 1) are captured and transferred regardless of positional tolerance factors of the holes 18 (see FIG. 1). Once the locations 12 (see FIG. 1) and the dimensions 14 (see FIG. 1) of the pattern 16 (see FIG. 1) of holes 18 (see FIG. 1) are captured on the first structure 24 (see FIG. 1) on an aircraft 200a (see FIG. 8), they may be transferred and drilled onto the second structure 26 (see FIGS. 3A-3B), off the assembly line or off the aircraft 200a (see FIG. 8).

Referring now to the Figures, FIG. 1 is an illustration of a top view of an exemplary embodiment of the first structure 24, such as in the form of an object part 24a, that may be used with the tool assembly 10 (see FIGS. 2A-2B, 4A-4B), the system 80 (see FIGS. 5A-5C), and the method 150 (see FIG. 7) of the disclosure. As shown in FIG. 1, the first structure 24, such as in the form of object part 24a, comprises the locations 12 and the dimensions 14 of a pattern 16 of holes 18 that are intended to be captured using the tool assembly 10 (see FIG. 2A-2B) and transferred to the second structure 26 (see FIGS. 3A-3B). As shown in FIG. 1, an exemplary pattern 16 of holes 18 comprises six (6) holes 18. However, the number of holes 18 may comprise any number of holes 18.

As shown in FIG. 1, the first structure 24, such as in the form of object part 24a, further comprises two or more first structure index holes 22. In one embodiment, the first structure index holes 22 (see FIG. 1) are fixed holes comprising a first index hole 23a (see FIG. 1) and a second index hole 23b (see FIG. 1). The first structure 24 (see FIG. 1), such as in the form of object part 24a (see FIG. 1), may be fabricated or machined using known fabrication or machining devices that form the holes 18 (see FIG. 1) in the first structure 24 (see FIG. 1).

Figure 2B:
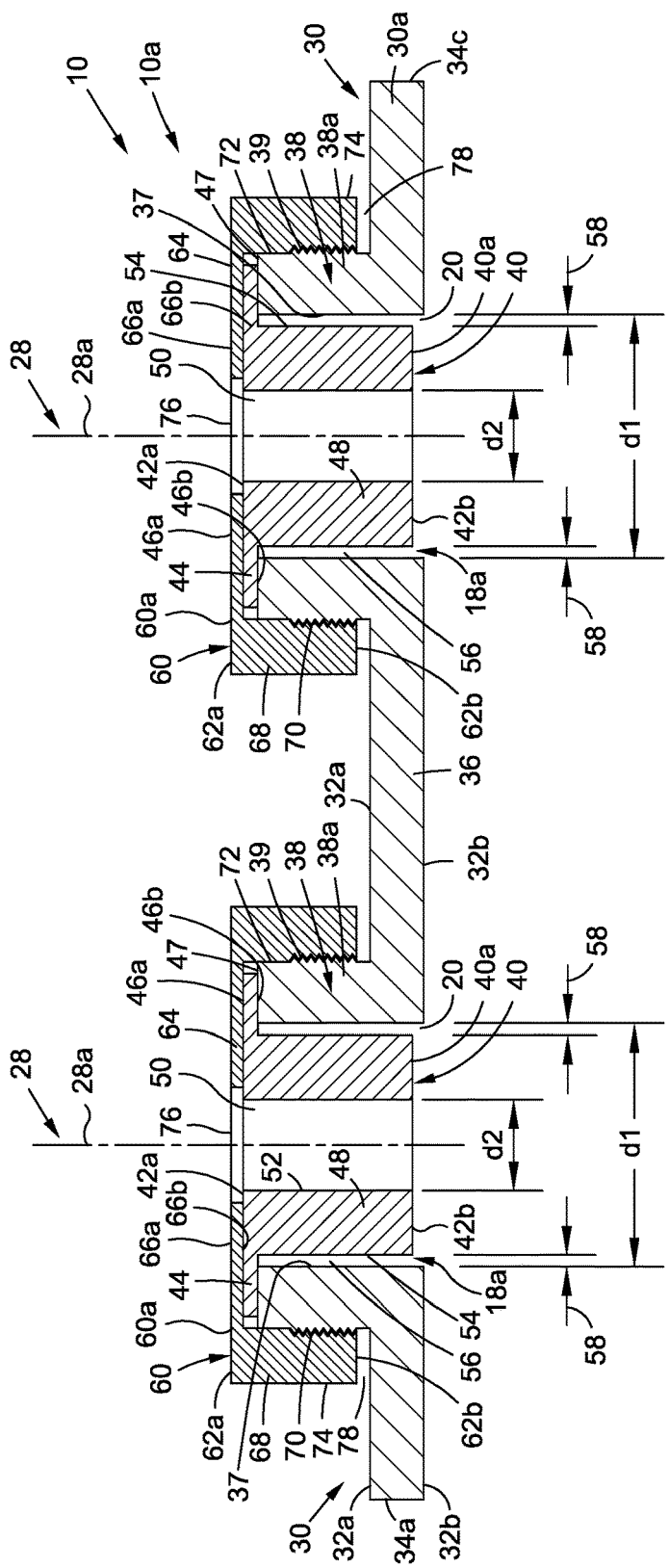
FIG. 2B is an illustration of a cross-sectional view of the tool assembly of FIG. 2A, taken along lines 2B-2B of FIG. 2A.

Referring now to FIGS. 2A-2B, FIG. 2A an illustration of a top view of an exemplary embodiment of a tool assembly 10, such as in the form of tool assembly 10a, of the disclosure, and FIG. 2B is an illustration of a cross-sectional view of the tool assembly 10, such as in the form of tool assembly 10a, of FIG. 2A, taken along lines 2B-2B of FIG. 2A. As shown in FIG. 2A, the tool assembly 10, such as in the form of tool assembly 10a, preferably comprises a hole transfer drill jig assembly 11.

As shown in FIG. 2A, the tool assembly 10, such as in the form of tool assembly 10a, comprises a transfer plate 30, such as in the form of an open-ended transfer plate 30a, having a transfer plate pattern 16a of transfer plate holes 18a formed through the body 36 of the transfer plate 30. The transfer plate pattern 16a (see FIG. 2A) is identical, or substantially identical, to the pattern 16 (see FIG. 1) in the first structure 24 (see FIG. 1), and the number of transfer plate holes 18a (see FIG. 2A) is preferably equal to the number of holes 18 (see FIG. 1) in the first structure 24 (see FIG. 1). For example, as shown in FIG. 2A, an exemplary transfer plate pattern 16a of transfer plate holes 18a comprises six (6) transfer plate holes 18a. However, the number of transfer plate holes 18a may comprise any number of transfer plate holes 18a, as long as they are preferably the same number of holes 18 as in the first structure 24.

The transfer plate holes 18a (see FIG. 2A) of the transfer plate 30 (see FIG. 2A) comprise a plurality of oversize holes 20 (see FIG. 2A). Each oversize hole 20 (see FIGS. 2B, 5A) of the transfer plate 30 (see FIGS. 2B, 5A) has an oversize hole diameter d1 (see FIGS. 2B, 5A) greater than a diameter d3 (see FIG. 5A) of the hole 18 (see FIGS. 1, 5A) in the first structure 24 (see FIGS. 1, 5A).

The transfer plate 30 (see FIG. 2A) further comprises at least two transfer plate index holes 22a (see FIG. 2A). The transfer plate index holes 22a (see FIG. 2A) preferably comprise the first index hole 23a (see FIG. 2A) and the second index hole 23b (see FIG. 2A). The at least two transfer plate index holes 22a (see FIG. 2A) are preferably substantially identical in size and shape to the at least two corresponding first structure index holes 22 (see FIG. 1) in the first structure 24 (see FIG. 1). The transfer plate index holes 22a (see FIG. 2A) allow for repeatability, that is, repeatedly having the ability to locate or position the tool assembly 10 (see FIG. 2A) to the first structure 24 (see FIG. 1) by matching up or indexing the transfer plate index holes 22a (see FIG. 2A) to the first structure index holes 22 (see FIG. 1) of the first structure 24 (see FIG. 1). The transfer plate 30 (see FIG. 2A) is fabricated or machined using known fabrication or machining devices that form the transfer plate holes 18a (see FIG. 2A) and the transfer plate index holes 22a (see FIG. 2A).

As shown in FIG. 2A, the transfer plate 30, such as in the form of open-ended transfer plate 30a, comprises sides 34a, 34b, 34c, and 34d. The transfer plate 30 (see FIGS. 2B, 5A) may be open on the sides 34a, 34c (see FIG. 2A), or the transfer plate 30 (see FIGS. 4B, 5B-5C) may be closed on the sides 34a, 34c (see FIG. 4B).

As shown in FIG. 2B, the transfer plate 30, such as in the form of open-ended transfer plate 30a, comprises a first surface 32a, a second surface 32b, a body 36, and one or more inner walls 37. As further shown in FIG. 2B, the transfer plate 30, such as in the form of open-ended transfer plate 30a, preferably has one or more transfer plate threaded portions 38 with threads 39. The transfer plate threaded portion 38 (see FIGS. 2B, 5A) may be in the form of an exterior threaded portion 38a (see FIG. 2B), when the transfer plate 30 (see FIG. 2B) is in the form of the open-ended transfer plate 30a (see FIG. 2B). Alternatively, the transfer plate threaded portion 38 (see FIGS. 4B, 5B) may be in the form of a first interior threaded portion 38b (see FIGS. 4B, 5B), when the transfer plate 30 (see FIGS. 4B, 5B) is in the form of a closed-ended first interior threaded transfer plate 30b (see FIGS. 2B, 5B), or the transfer plate threaded portion 38 (see FIG. 5C) may be in the form of a second interior threaded portion 38c (see FIG. 5C), when the transfer plate 30 is in the form of a close-ended second interior threaded transfer plate 30c (see FIG. 5C).

As shown in FIGS. 2A-2B, the tool assembly 10 further comprises one or more alignment elements 40 installed in the plurality of oversize holes 20. The one or more alignment elements 40 (see FIGS. 2A-2B) is each preferably in the form of a floating bushing 40a (see FIG. 2B). However, the alignment element 40 may also be in another suitable form or apparatus.

As shown in FIG. 2B, each of the one or more alignment elements 40 comprises a first end 42a, a second end 42b, a flange portion 44, and a body member 48. The flange portion 44 (see FIG. 2B) is formed at the first end 42a (see FIG. 2B) of the alignment element 40 (see FIG. 2B), and extends laterally from the body member 48. The flange portion 44 (see FIG. 2B) has a top side 46a (see FIG. 2B) and a bottom side 46b (see FIG. 2B). As shown in FIG. 2B, the bottom side 46b of the flange portion 44 is adjacent an abutment surface 47 of the transfer plate 30, when the one or more alignment elements 40 are secured in place in and against the transfer plate 30.

The body member 48 (see FIG. 2B) of the alignment element 40 (see FIG. 2B) is preferably inserted within, or substantially within, the transfer plate hole 18a (see FIG. 2B), such as in the form of oversize hole 20 (see FIG. 2B). The flange portion 44 (see FIG. 2B) is preferably positioned above and exterior to the interior of the oversize hole 20 (see FIG. 2B), and is configured to rest against the abutment surface 47 (see FIG. 2B) of the transfer plate 30 (see FIG. 2B).

As shown in FIG. 2B, each alignment element 40 has a through opening 50 formed through the alignment element 40. The through opening 50 (see FIG. 2B) runs from the first end 42a (see FIG. 2B) of the alignment element 40 (see FIG. 2B) continuously through to the second end 42b (see FIG. 2B) of the alignment element 40 (see FIG. 2B). The through opening 50 (see FIG. 2B) has a through opening diameter d2 (see FIG. 2B). The oversize hole diameter d1 (see FIG. 2B) of the oversize hole 20 (see FIG. 2B) is greater than the diameter d2 (see FIG. 2B) of the through opening 50 (see FIG. 2B).

As shown in FIG. 2B, the through opening 50 is in a coaxial alignment 28 with the oversize hole 20. The coaxial alignment 28 (see FIG. 2B) may comprise a centerline axis coaxial alignment 28a (see FIG. 2B) through the center of the through opening 50 (see FIG. 2B) and through the center of the transfer plate 30 (see FIG. 2B). However, the coaxial alignment 28 may be along another axis other than the centerline axis.

As shown in FIG. 2B, the alignment element 40 has an interior 52 and an exterior 54. Because the oversize hole 20 (see FIG. 2B) is larger than the outer circumference of the body member 48 (see FIG. 2B) of the alignment element 40 (see FIG. 2B), the oversize hole 20 (see FIG. 2B) allows for the formation of an alignment variation gap 56 (see FIG. 2B) between the exterior 54 (see FIG. 2B) of the alignment element 40 (see FIG. 2B) and the inner wall 37 (see FIG. 2B) of the oversize hole 20 (see FIG. 2B) of the transfer plate 30 (see FIG. 2B). The alignment variation gap 56 (see FIG. 2B) allows the alignment element 40 (see FIG. 2B) to move or float a floating distance 58 (see FIG. 2B) within the oversize hole 20 (see FIG. 2B) to be aligned with and located coaxial to the hole 18 (see FIGS. 1, 5A) in the first structure 24 (see FIGS. 1, 5A).

As shown in FIGS. 2A-2B, the tool assembly 10 further comprises one or more holding elements 60 coupled to the transfer plate 30. The one or more holding elements 60 each preferably comprises a clamp bushing 60a. However, the holding element 60 may also be in the form of a locking device such as a lever lock device, or another suitable holding, clamping, or locking element. As shown in FIG. 2B, each holding element 60 comprises a first end 62a, a second end 62b, a cap portion 64, and a body portion 68. The cap portion 64 (see FIG. 2B) has a top side 66a (see FIG. 2B) and a bottom side 66b (see FIG. 2B). As shown in FIG. 2B, the bottom side 66b of the cap portion 64 is adjacent the top side 46a of the flange portion 44, when the one or more holding elements 60 secure or hold down the one or more alignment elements 40 in place in and against the transfer plate 30.

As shown in FIG. 2B, the body portion 68 of the holding element 60 comprises a holding element threaded portion 70 that is configured for coupling or threaded attachment to the threads 39 of the transfer plate threaded portion 38, to attach the holding element 60 to the transfer plate 30. When the one or more holding elements 60 secure or hold down the one or more alignment elements 40 in place in and against the transfer plate 30, the holding element threaded portion 70 is securely attached to the transfer plate threaded portion 38.

As shown in FIG. 2B, the holding element 60 has an interior 72, an exterior 74, and a central through opening 76. The central through opening 76 (see FIG. 2B) is in coaxial alignment 28 (see FIG. 2B) with the oversize hole 20 (see FIG. 2B) of the transfer plate 30 (see FIG. 2B), and is also in coaxial alignment 28 (see FIG. 2B) with the through opening 50 (see FIG. 2B) of the alignment element 40 (see FIG. 2B). As shown in FIG. 2B, when the holding element 60 secures or holds down the alignment element 40 in place in and against the transfer plate 30, a gap 78 is formed between the second end 62b of the holding element 60 and the first surface 32a of the transfer plate 30.

Now referring to FIG. 3A, FIG. 3A is an illustration of a top view of an exemplary embodiment of a second structure 26 that may be used with the tool assembly 10 (see FIG. 2B), the system 80 (see FIG. 5A), and the method 150 (see FIG. 7) of the disclosure. Prior to transfer and drilling of the pattern 16 (see FIG. 1) of holes 18 (see FIG. 1), the second structure 26 (see FIG. 3A) is in the form of a blank target part 26a.

Figure 3B:
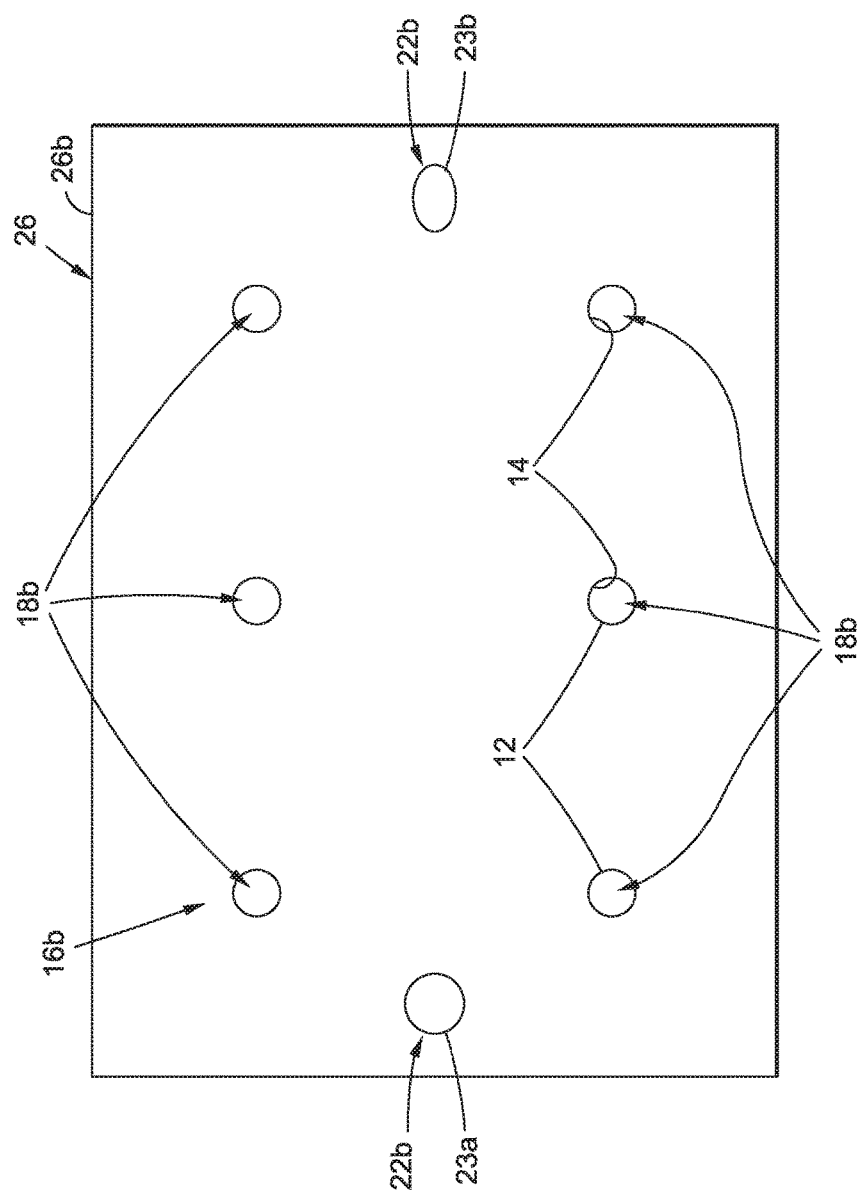
FIG. 3B is an illustration of a top view of the second structure of FIG. 3A, after drilling.

As shown in FIG. 3A, the second structure 26 in the form of the blank target part 26a has second structure index holes 22b. The second structure index holes 22b (see FIG. 3A) comprise a first index hole 23a (see FIG. 3A) and a second index hole 23b (see FIG. 3A). The second structure index holes 22b (see FIG. 3A) are preferably identical, or substantially identical, to the locations 12 (see FIG. 1) and the dimensions 14 (see FIG. 1), including size and shape, of the at least two corresponding first structure index holes 22 (see FIG. 1) in the first structure 24 (see FIG. 1). The second structure index holes 22b (see FIG. 3A) are also preferably identical, or substantially identical, to the locations 12 and the dimensions 14, including size and shape, to the at least two corresponding transfer plate index holes 22a (see FIG. 2A) in the transfer plate 30 (see FIG. 2A). The second structure 26 (see FIG. 3A), such as in the form of the blank target part 26a (see FIG. 3A), is configured to be drilled with a drilling apparatus 114 (see FIG. 3A) and may be fabricated or machined using known fabrication or machining devices that form the second structure holes 18b (see FIG. 3B) in the second structure 26 (see FIG. 3B).

Now referring to FIG. 3B, FIG. 3B is an illustration of a top view of the second structure 26 of FIG. 3A, after transfer and drilling of the pattern 16 (see FIG. 1) of holes 18 (see FIG. 1), where the second structure 26 is in the form of a drilled target part 26b. As shown in FIG. 3B, a second structure pattern 16b of second structure holes 18b is drilled into the blank target part 26a (see FIG. 3A) to form the drilled target part 26b. Preferably, the second structure pattern 16b (see FIG. 3B) of second structure holes 18b (see FIG. 3B) is identical, or substantially identical, to the locations 12 (see FIG. 1) and the dimensions 14 (see FIG. 1), including size and shape, of the pattern 16 (see FIG. 1) of holes 18 (see FIG. 1) in the first structure 24 (see FIG. 1). Preferably, the second structure pattern 16b (see FIG. 3B) of second structure holes 18b (see FIG. 3B) is also identical, or substantially identical, to the locations 12 (see FIG. 1) and the dimensions 14 (see FIG. 1), including size and shape, of the transfer plate pattern 16 (see FIG. 2A) of transfer plate holes 18a (see FIG. 2A) in the transfer plate 30 (see FIG. 2A).

The number of second structure holes 18b (see FIG. 3B) is preferably equal to the number of transfer plate holes 18a (see FIG. 2A) and is equal to the number of holes 18 (see FIG. 1) in the first structure 24 (see FIG. 1). For example, as shown in FIG. 3B, an exemplary second structure pattern 16b of second structure holes 18b comprises six (6) second structure holes 18b. However, the number of second structure holes 18b (see FIG. 3B) may comprise any number of second structure holes 18b, as long as they are preferably the same number of holes 18 (see FIG. 1) as in the first structure 24 (see FIG. 1), and the same number of transfer plate holes 18a (see FIG. 2A) as in the transfer plate 30 (see FIG. 2A).

Figure 4A:
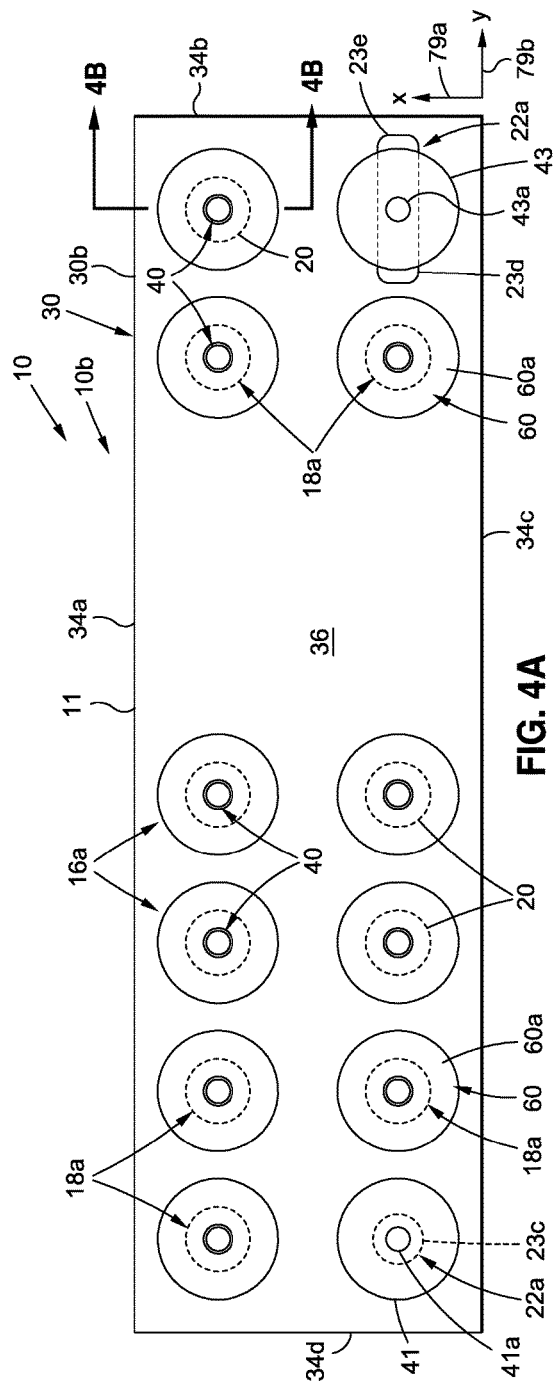
FIG. 4A is an illustration of a top view of another exemplary embodiment of a tool assembly of the disclosure.
Figure 4B:
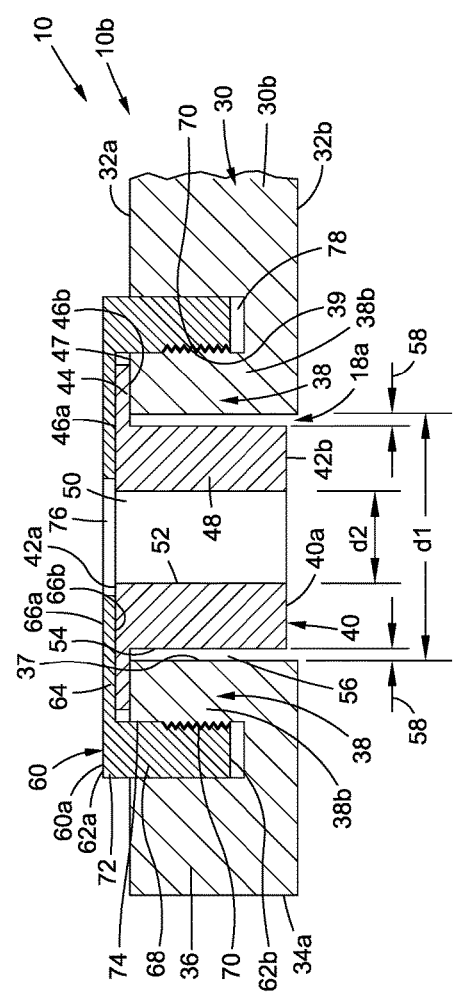
FIG. 4B is an illustration of a partial cross-sectional view of the tool assembly of FIG. 4A, taken along lines 4B-4B of FIG. 4A.

Now referring to FIGS. 4A-4B, FIG. 4A is an illustration of a top view of another exemplary embodiment of a tool assembly 10, such as in the form of tool assembly 10b, of the disclosure. FIG. 4B is an illustration of a partial cross-sectional view of the tool assembly 10, such as in the form of tool assembly 10b, of FIG. 4A, taken along lines 4B-4B of FIG. 4A. As shown in FIG. 4A, the tool assembly 10, such as in the form of tool assembly 10b, preferably comprises a hole transfer drill jig assembly 11. In this embodiment, as shown in FIG. 4A, the number of transfer plate holes 18a is ten (10), and the number of transfer plate index holes 22a is two (2), where the transfer plate index holes 22a comprise a fixed index hole 23c and a floating index hole 23d.

As shown in FIG. 4A, the tool assembly 10, such as in the form of tool assembly 10b, comprises the transfer plate 30, such as in the form of closed-ended first interior threaded transfer plate 30b, having the transfer plate pattern 16a of transfer plate holes 18a formed through the body 36 of the transfer plate 30. The transfer plate pattern 16a (see FIG. 4A) of transfer plate holes 18a (see FIG. 4A) is a replica of a pattern 16 (see FIG. 4C) of holes 18 (see FIG. 4C) in a first structure 24 (see FIG. 4C), such as an object part 24c (see FIG. 4C), as the first structure 24 (see FIG. 4C) is used as a basis to fabricate the transfer plate 30 (see FIG. 4A). For example, instead of six (6) holes 18, as shown in FIG. 1, in this embodiment, the pattern 16 of holes 18 in the first structure 24, as shown in FIG. 4C, comprises ten (10) holes 18 (see FIG. 4C).

The transfer plate holes 18a (see FIG. 4A) of the transfer plate 30 (see FIG. 4A) comprise a plurality of oversize holes 20 (see FIGS. 4A-4B). Each oversize hole 20 (see FIGS. 4A-4B) of the transfer plate 30 (see FIGS. 4A-4B) has the oversize hole diameter d1 (see FIG. 4B). The oversize hole diameter d1 (see FIG. 4B) is greater than the diameter d2 (see FIG. 4B) of the through hole 50 (see FIG. 4B) in the alignment element 40 (see FIG. 4B). The oversize hole diameter d1 (see FIG. 4B) is also greater than the diameter d3 (see FIG. 5A) of the hole 18 (see FIG. 5A) in the first structure 24 (see FIG. 5A). As further shown in FIG. 4A, the transfer plate 30, such as in the form of closed-ended first interior threaded transfer plate 30b, comprises sides 34a, 34b, 34c, and 34d.

The transfer plate 30 (see FIG. 4A) further comprises at least two transfer plate index holes 22a (see FIG. 4A). In this embodiment, as shown in FIG. 4A, the transfer plate index holes 22a comprise a fixed index hole 23c and a floating index hole 23d. The transfer plate index holes 22a (see FIG. 4A) allow for repeatability of the ability to locate and position the tool assembly 10 (see FIG. 4A) to the first structure 24 (see FIG. 4C) in a repeatable manner.

As shown in FIG. 4A, the fixed index hole 23c is configured to receive a fixed bushing 41 having a through opening 41a. The fixed bushing 41 (see FIG. 4A) initially indexes the tool assembly 10 (see FIG. 4A), such as in the form of tool assembly 10b (see FIG. 4A), in an x-direction 79a (see FIG. 4A) and in a y-direction 79b (see FIG. 4A), to the first structure 24 (see FIG. 4C).

As shown in FIG. 4A, the floating index hole 23d may be in the form of a slot 23e. However, the floating index hole 23d (see FIG. 4A) may also be of another suitable configuration or shape. The floating index hole 23d (see FIG. 4A) is configured to receive a slotted floating bushing 43 (see FIG. 4A) having a through opening 43a (see FIG. 4A). The slotted floating bushing 43 (see FIG. 4A) initially indexes the tool assembly 10 (see FIG. 4A), such as in the form of tool assembly 10b (see FIG. 4A), in the x-direction 79a (see FIG. 4A), to the first structure 24 (see FIG. 4C). The floating index hole 23d (see FIG. 4A) allows the slotted floating bushing 43 (see FIG. 4A) to float or move in the y-direction 79b (see FIG. 4A).

As shown in FIG. 4B, the transfer plate 30, such as in the form of closed-ended first interior threaded transfer plate 30b, comprises the first surface 32a, the second surface 32b, the body 36, and one or more inner walls 37. As further shown in FIG. 4B, the transfer plate 30, such as in the form of closed-ended first interior threaded transfer plate 30b, preferably has one or more transfer plate threaded portions 38 with threads 39. In the embodiment shown in FIG. 4B, the transfer plate threaded portion 38 is in the form of first interior threaded portion 38b.

As shown in FIG. 4A-4B, the tool assembly 10, such as in the form of tool assembly 10b, further comprises one or more alignment elements 40 installed in the plurality of oversize holes 20. Each of the one or more alignment elements 40 (see FIGS. 4A-4B) is preferably in the form of a floating bushing 40a (see FIG. 2B). However, the alignment element 40 may also be of another suitable form or apparatus.

As shown in FIG. 4B, and as discussed above, each of the one or more alignment elements 40 comprises the first end 42a, the second end 42b, the flange portion 44 with the top side 46a and the bottom side 46b, the body member 48, and the through opening 50 with the through opening diameter d2. As shown in FIG. 4B, when the one or more alignment elements 40 are secured in place, in and against the transfer plate 30, the bottom side 46b of the flange portion 44 is adjacent the abutment surface 47 of the transfer plate 30, and the through opening 50 is in coaxial alignment 28, such as centerline axis coaxial alignment 28a, with the oversize hole 20.

As shown in FIG. 4B, the alignment element 40 has an interior 52 and an exterior 54. As discussed above, the alignment variation gap 56 (see FIG. 4B) is formed between the exterior 54 (see FIG. 4B) of the alignment element 40 (see FIG. 4B) and the inner wall 37 (see FIG. 4B) of the oversize hole 20 (see FIG. 4B) of the transfer plate 30 (see FIG. 4B). The alignment variation gap 56 (see FIG. 4B) allows the alignment element 40 (see FIG. 4B) to move or float the floating distance 58 (see FIG. 4B) within the oversize hole 20 (see FIG. 4B) to be located coaxial to the hole 18 (see FIGS. 4C, 5A) in the first structure 24 (see FIGS. 4C, 5A).

As shown in FIGS. 4A-4B, the tool assembly 10 further comprises one or more holding elements 60 coupled to the transfer plate 30. The one or more holding elements 60 (see FIG. 4B) each preferably comprises a clamp bushing 60a (see FIG. 4B). The holding element 60 (see FIG. 4B) may also be in the form of a locking device such as a lever lock device, or another suitable holding, clamping, or locking element. As shown in FIG. 4B, and discussed above, each holding element 60 comprises a first end 62a, a second end 62b, a cap portion 64 having a top side 66a and a bottom side 66b, and a body portion 68. As shown in FIG. 4B, the bottom side 66b of the cap portion 64 is adjacent the top side 46a of the flange portion 44, when the one or more holding elements 60 secure or hold down the one or more alignment elements 40 in place in and against the transfer plate 30.

As shown in FIG. 4B, the body portion 68 of the holding element 60 comprises the holding element threaded portion 70 that is configured for coupling or threaded attachment to the threads 39 of the transfer plate threaded portion 38, to attach the holding element 60 to the transfer plate 30. As shown in FIG. 4B, and as discussed above, the holding element 60 has the interior 72, the exterior 74, and the central through opening 76, which is in coaxial alignment 28 with the oversize hole 20, and is also in coaxial alignment 28 with the through opening 50 of the alignment element 40. As shown in FIG. 4B, when the holding element 60 secures or holds down the alignment element 40 in place in and against the transfer plate 30, the gap 78 is formed between the second end 62b of the holding element 60 and the first surface 32a of the transfer plate 30.

Now referring to FIG. 4C, FIG. 4C is an illustration of a top view of another exemplary embodiment of the first structure 24, such as in the form of object part 24b, that may be used with embodiments of the tool assembly 10 (see FIGS. 4A-4B), the system 80 (see FIG. 5B), and the method 150 (see FIG. 7) of the disclosure. As shown in FIG. 4C, the first structure 24, such as in the form of object part 24b, comprises the locations 12 and the dimensions 14 of the pattern 16 of holes 18 that are intended to be captured using the tool assembly 10 (see FIGS. 4A-4B) and transferred to the second structure 26 (see FIG. 4D). As shown in FIG. 4C, the pattern 16 of holes 18 comprises ten (10) holes 18 and two (2) first structure index holes 22. The first structure index holes 22 (see FIG. 4C) comprise the fixed index hole 23c (see FIG. 4C) and the floating index hole 23d (see FIG. 4C), such as in the form of slot 23e (see FIG. 4C). The first structure 24 (see FIG. 4C), such as in the form of object part 24b (see FIG. 4C), may be fabricated or machined using known fabrication or machining devices that form the holes 18 (see FIG. 4C) in the first structure 24 (see FIG. 4C).

Now referring to FIG. 4D, FIG. 4D is an illustration of a top view of another exemplary embodiment of a second structure 26, prior to transfer and drilling, that may be used with the tool assembly 10 (see FIG. 4B), the system 80 (see FIG. 5B), and the method 150 (see FIG. 7) of the disclosure. Prior to transfer and drilling of the pattern 16 (see FIG. 4C) of holes 18 (see FIG. 4C), the second structure 26 (see FIG. 4D) is in the form of a blank target part 26c.

As shown in FIG. 4D, the second structure 26 in the form of the blank target part 26c has second structure index holes 22b in the form of fixed index hole 23c (see FIG. 4D) and floating index hole 23d (see FIG. 4D), such as in the form of slot 23e (see FIG. 4D). The second structure index holes 22b (see FIG. 4D) are preferably identical, or substantially identical, to the locations 12 (see FIG. 4C) and the dimensions 14 (see FIG. 4C), including size and shape, of the at least two corresponding first structure index holes 22 (see FIG. 4C) in the first structure 24 (see FIG. 4C). The second structure index holes 22b (see FIG. 4D) are also preferably identical, or substantially identical, to the locations and the dimensions, including size and shape, to the at least two corresponding transfer plate index holes 22a (see FIG. 4A) in the transfer plate 30 (see FIG. 4A). The second structure 26 (see FIG. 4D), such as in the form of the blank target part 26c (see FIG. 4D), is configured to be drilled with a drilling apparatus 114 (see FIG. 4D) and may be fabricated or machined using known fabrication or machining devices that form the second structure holes 18b (see FIG. 4D) in the second structure 26 (see FIG. 4D).

Now referring to FIG. 4E, FIG. 4E is an illustration of a top view of the second structure 26 of FIG. 4D, after transfer and drilling of the pattern 16 (see FIG. 4C) of holes 18 (see FIG. 4C), where the second structure 26 is in the form of a drilled target part 26d. As shown in FIG. 4E, the second structure pattern 16b of second structure holes 18b is drilled into the blank target part 26c (see FIG. 4D) to form the drilled target part 26d. Preferably, the second structure pattern 16b (see FIG. 4E) of second structure holes 18b (see FIG. 4E) is identical, or substantially identical, to the locations 12 (see FIG. 4C) and the dimensions 14 (see FIG. 4C), including size and shape, of the pattern 16 (see FIG. 4C) of holes 18 (see FIG. 4C) in the first structure 24 (see FIG. 4C1). Preferably, the second structure pattern 16b (see FIG. 4E) of second structure holes 18b (see FIG. 4E) is also identical, or substantially identical, to the locations 12 (see FIG. 4C) and the dimensions 14 (see FIG. 4C), including size and shape, of the transfer plate pattern 16 (see FIG. 4A) of transfer plate holes 18a (see FIG. 4A) in the transfer plate 30 (see FIG. 4A).

As shown in FIG. 4E, an exemplary second structure pattern 16b of second structure holes 18b comprises ten (10) second structure holes 18b. However, the number of second structure holes 18b (see FIG. 4E) may comprise any number of second structure holes 18b, as long as they are preferably the same number of holes 18 (see FIG. 4C) as in the first structure 24 (see FIG. 4C), and the same number of transfer plate holes 18a (see FIG. 4A) as in the transfer plate 30 (see FIG. 4A).

Figure 5B:
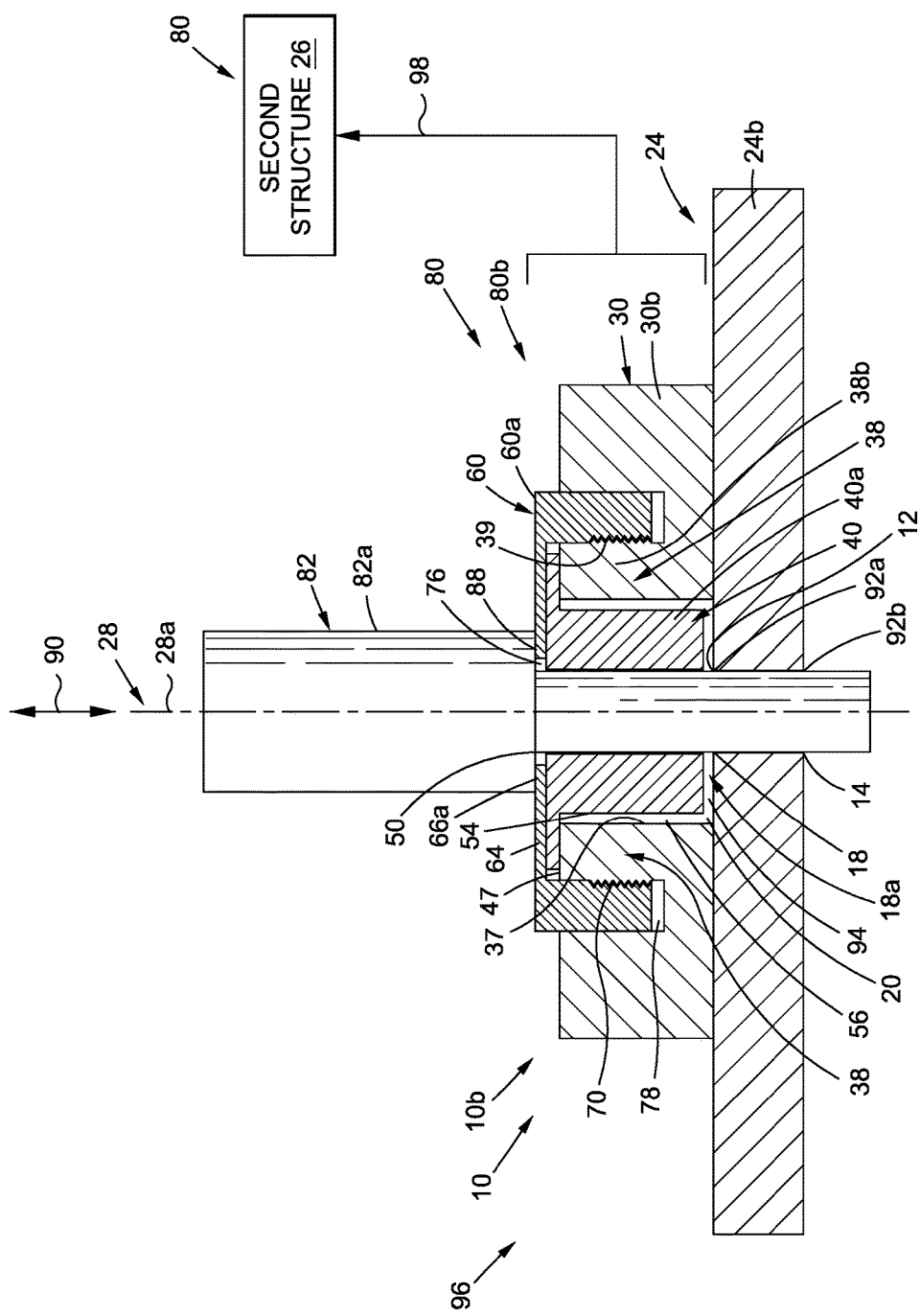
FIG. 5B is an illustration of a partial cross-sectional view of another exemplary embodiment of a system of the disclosure with another embodiment of a tool assembly.
Figure 5C:
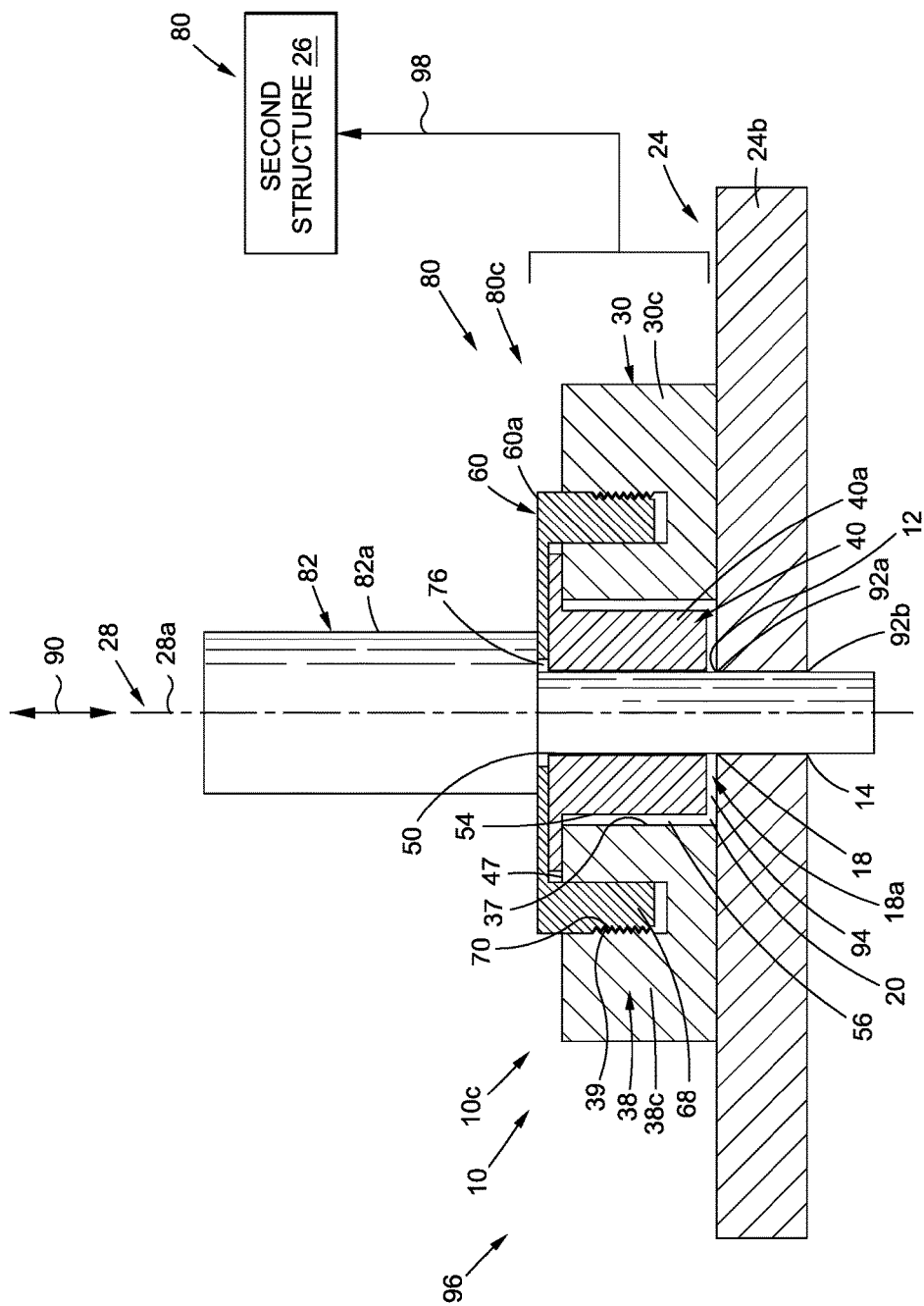
FIG. 5C is an illustration of a partial cross-sectional view of another exemplary embodiment of a system of the disclosure with another embodiment of a tool assembly.

Now referring to FIGS. 5A-5C, various embodiments of the system 80 that incorporate an embodiment of the tool assembly 10 (see FIGS. 2A-2B, 4A-4B) are shown. FIG. 5A is an illustration of a side cross-sectional view of an exemplary embodiment of a system 80, such as in the form of system 80a, of the disclosure with an embodiment of a tool assembly 10, such as in the form of tool assembly 10a. FIG. 5B is an illustration of a side cross-sectional view of another exemplary embodiment of a system 80, such as in the form of system 80b, of the disclosure with another embodiment of the tool assembly 10, such as in the form of tool assembly 10b. FIG. 5C is an illustration of a side cross-sectional view of another exemplary embodiment of a system 80, such as in the form of system 80c, of the disclosure with an embodiment of a tool assembly 10, such as in the form of tool assembly 10c.

In FIGS. 5A-5C, there is provided the system 80 for transferring locations 12 and dimensions 14 of a pattern 16 (see FIGS. 1, 4C) of holes 18 from the first structure 24 to a second structure 26 (see FIGS. 3A-3B, 4D-4E). As shown in FIGS. 5A-5C, the system 80 comprises the first structure 24 having the pattern 16 of holes 18 with the locations 12 and the dimensions 14. In FIG. 5A, the first structure 24 comprises object part 24a. In FIGS. 5B-5C, the first structure 24 comprises object part 24b.

As shown in FIGS. 5A-5C, the tool assembly 10 of the system 80 comprises the transfer plate 30 having the transfer plate pattern 16a (see FIGS. 2A, 4A) of transfer plate holes 18a formed through the transfer plate 30. The transfer plate 30 (see FIGS. 5A-5C) includes transfer plate holes 18a (see FIGS. 5A-5C) comprising a plurality of oversize holes 20 (see FIGS. 5A-5C) and at least two transfer plate index holes 22a (see FIGS. 2A, 4A). Each oversize hole 20 (see FIGS. 5A-5C) of the transfer plate 30 (see FIGS. 5A-5C) has an oversize hole diameter d1 (see FIG. 5A) greater than a diameter d3 (see FIG. 5A) of the hole 18 (see FIG. 5A) in the first structure 24 (see FIGS. 5A-5C), and greater than a through opening diameter d2 (see FIGS. 2B, 4) of the through opening 50 (see FIGS. 2B, 4, 5A-5C) in the alignment element 40 (see FIGS. 2B, 4, 5A-5C).

In FIG. 5A, the transfer plate 30 comprises an open-ended transfer plate 30a, and the transfer plate threaded portion 38 is in the form of the exterior threaded portion 38a with threads 39. As shown in FIG. 5A, the exterior threaded portion 38a is coupled to the holding element threaded portion 70.

In FIG. 5B, the transfer plate 30 comprises a closed-ended first interior threaded transfer plate 30b, and the transfer plate threaded portion 38 is in the form of first interior threaded portion 38b with threads 39. As shown in FIG. 5B, the first interior threaded portion 38b is coupled to the holding element threaded portion 70.

In FIG. 5C, the transfer plate 30 comprises a closed-ended second interior threaded transfer plate 30c, and the transfer plate threaded portion 38 is in the form of second interior threaded portion 38c with threads 39. As shown in FIG. 5C, the second interior threaded portion 38c is coupled to the holding element threaded portion 70.

As shown in FIGS. 5A-5C, the tool assembly 10 of the system 80 comprises one or more alignment elements 40, such as in the form of floating bushings 40a, installed in the plurality of oversize holes 20. Each alignment element 40 (see FIGS. 5A-5C) has a through opening 50 in a coaxial alignment 28, such as a centerline axis coaxial alignment, with the oversize hole 20. As shown in FIGS. 5A-5C, the oversize hole 20 allows for formation of the alignment variation gap 56 between the exterior 54 of the alignment element 40 and the inner wall 37 of the oversize hole 20.

As shown in FIGS. 5A-5C, the tool assembly 10 of the system 80 comprises one or more holding elements 60, such as in the form of clamp bushings 60a, coupled to the transfer plate 30. Each holding element 60 has the central through opening 76 in coaxial alignment 28 with the oversize hole 20 of the transfer plate 30 and with the through opening 50 of the alignment element 40.

As shown in FIGS. 5A-5C, the system 80 further comprises one or more positioning pins 82 configured for insertion into each through opening 50 of the one or more alignment elements 40 and into each hole 18 of the first structure 24. The positioning pin 82 (see FIGS. 5A-5C) may be in the form of a bolt 82a (see FIGS. 5A-5C), or another suitable pin structure to position and locate each hole 18 (see FIGS. 5A-5C) in the first structure 24 (see FIGS. 5A-5C).

As shown in FIGS. 5A-5C, the positioning pin 82 may be removed and inserted in an up and down direction 90 from and into the central through opening 76, the through hole 50, oversize hole 20, and the hole 18 in the first structure 24. As shown in FIG. 5A, the positioning pin 82, such as in the form of bolt 82a, comprises a first end 84a, a second end 84b, and a body 86 therebetween. The body 86 (see FIG. 5A) comprises a head portion 86a (see FIG. 5A) and an insertion portion 86b (see FIG. 5A). The insertion portion 86b (see FIG. 5A) is inserted into and through the central through opening 76 (see FIG. 5A), the through hole 50 (see FIG. 5A), the oversize hole 20 (see FIG. 5A), and the hole 18 (see FIG. 5A) in the first structure 24 (see FIG. 5A). A portion 86c (see FIG. 5A) of the insertion portion 86b (see FIG. 5A) may extend beyond the opening 18 (see FIG. 5A) or farther into the interior of the first structure 24 (see FIG. 5A). The head portion 86a (see FIG. 5A) is not inserted into the central through opening 76 (see FIG. 5A), the through hole 50 (see FIG. 5A), the oversize hole 20 (see FIG. 5A), or the hole 18 (see FIG. 5A), and the head portion 86a (see FIG. 5A) has a bottom surface 88 that is configured to abut against the top side 66a of the cap portion 64.

As further shown in FIGS. 5A-5C, the first structure 24 has a top side 92a and a bottom side 92b. When the one or more holding elements 60 (see FIGS. 5A-5C) hold the one or more alignment elements 40 (see FIGS. 5A-5C) in place against the transfer plate 30 (see FIGS. 5A-5C), a spaced portion 94 is formed between the second end 42b (see FIGS. 2B, 4B) of the alignment element 40 (see FIGS. 5A-5C) and the top side 92a (see FIGS. 5A-5C) of the first structure 24 (see FIGS. 5A-5C).

As shown in FIGS. 5A-5C, when the tool assembly 10 is coupled to the first structure 24 and the one or more positioning pins 82 are inserted into the one or more alignment elements 40 and into the holes 18 of the first structure 24, the one or more holding elements 60 hold the one or more alignment elements 40 in place against the transfer plate 30, and the one or more alignment elements 40 are each set at a desired alignment position 96 to capture the locations 12 and the dimensions 14 of the pattern 16 (see FIGS. 1, 4C) of holes 18 and to provide transfer of the locations 12 and the dimensions 14 of the pattern 16 (see FIGS. 1, 4C) of holes 18 in the form of a transferred hole pattern 98 from the first structure 24 to the second structure 26.

When the alignment element 40 (see FIGS. 5A-5C) is in the desired alignment position 96 (see FIGS. 5A-5C), the flange portion 44 (see FIGS. 2B, 4B) of the alignment element 40 (see FIGS. 5A-5C) is coupled between the transfer plate 30 (see FIGS. 5A-5C) and the holding element 60 (see FIGS. 5A-5C). Further, when the alignment element 40 (see FIGS. 5A-5C) is in the desired alignment position 96 (see FIGS. 5A-5C), the cap portion 64 (see FIGS. 5A-5C) of the holding element 60 (see FIGS. 5A-5C) is configured to hold the alignment element 40 (see FIGS. 5A-5C).

As shown in FIGS. 5A-5C, the system 80 further comprises the second structure 26 configured for drilling of the locations 12 and the dimensions 14 of the pattern 16 (see FIGS. 1, 4C) of holes 18 captured and transferred from the first structure 24 with the tool assembly 10. The system 80 (see FIGS. 5A-5C) further comprises a drilling apparatus 114 (see FIGS. 3A, 4D) for drilling the second structure pattern 16b (see FIGS. 3B, 4E) of second structure holes 18b (see FIGS. 3B, 4E) in the second structure 26 (see FIGS. 3B, 4E, 5A-5C) that are substantially identical to the pattern 16 (see FIGS. 1, 4C) of holes 18 (see FIGS. 1, 4C, 5A-5C) captured and transferred from the first structure 24 (see FIGS. 1, 4C, 5A-5C) with the tool assembly 10 (see FIGS. 5A-5C). The drilling apparatus 114 (see FIGS. 3A, 4D) may comprise a manual drill, a milling machine, a CNC (computer numeric control) automated machine, or another suitable drilling or milling machine.

Figure 6A:
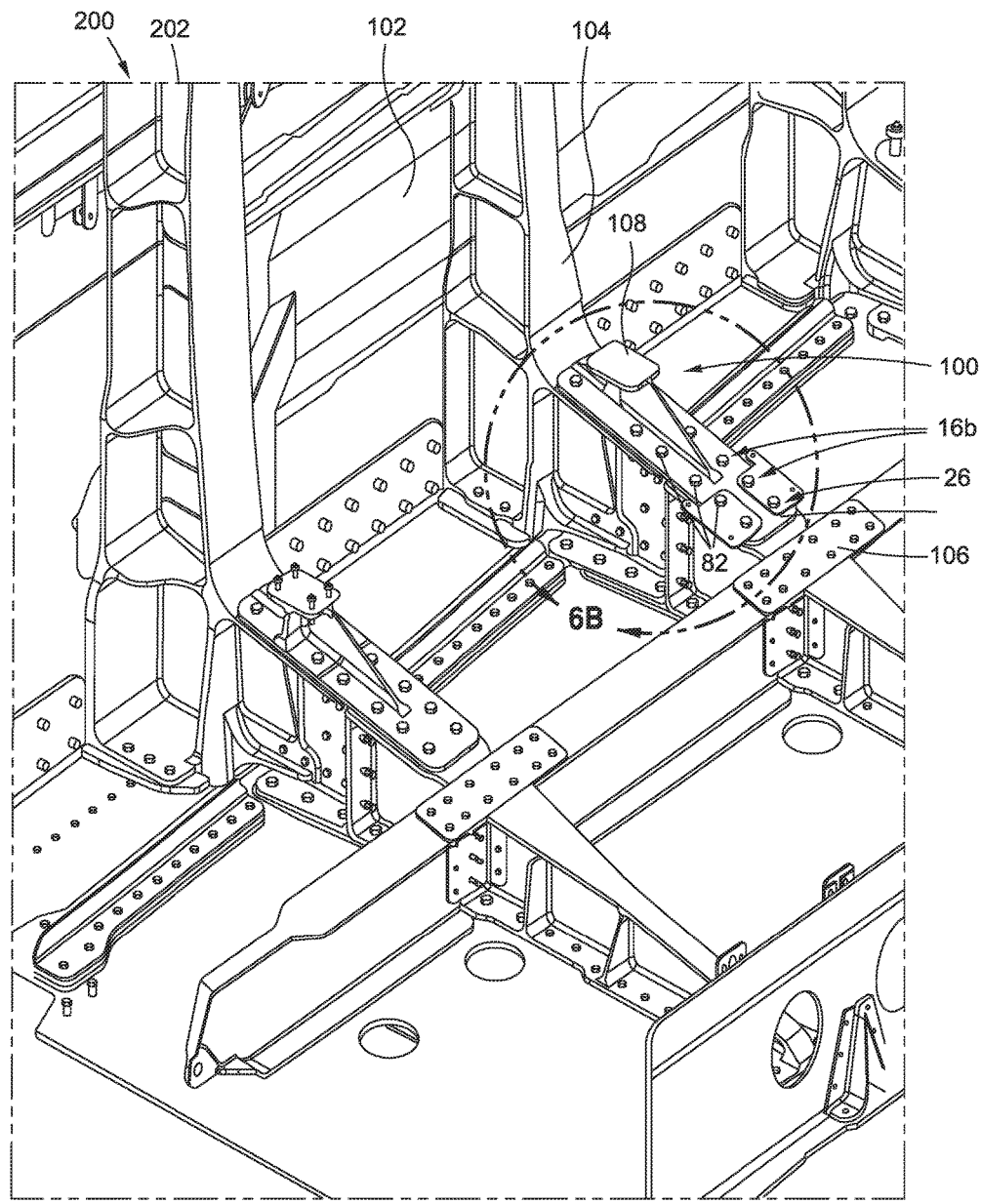
FIG. 6A is an illustration of a perspective view of an embodiment of an installed part, installed in an air vehicle, that is machined with embodiments of a tool assembly, system, and method of the disclosure.
Figure 6B:
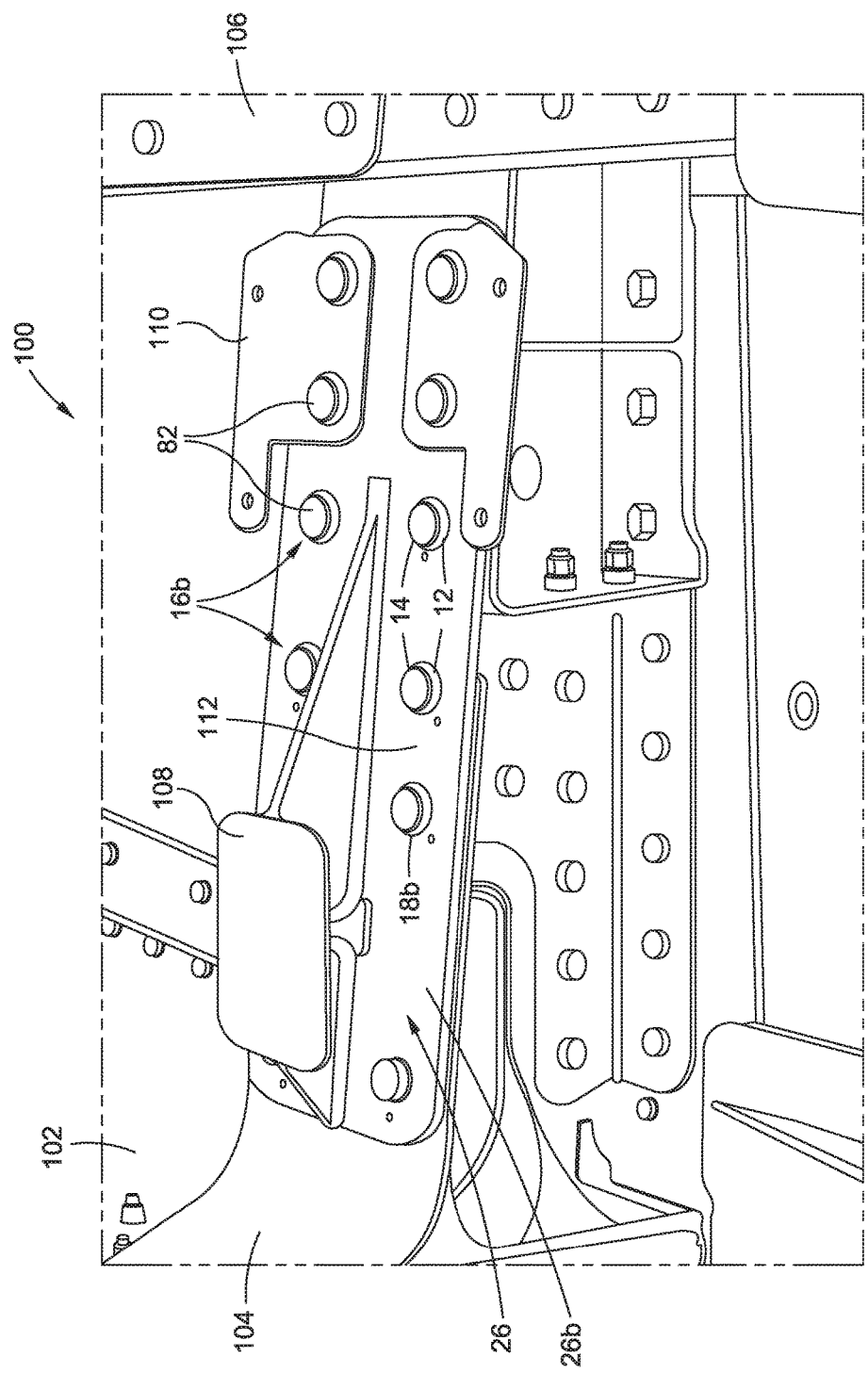
FIG. 6B is an illustration of an enlarged perspective view of the installed part of FIG. 6A.

Now referring to FIGS. 6A-6B, FIG. 6A is an illustration of a perspective view of an embodiment of an installed part 100 comprising the second structure 26, such as in the form of the drilled target part 26b, installed in a mid-body section 102 of a fuselage 202 of an air vehicle 200, and FIG. 6B is an illustration of an enlarged perspective view of the installed part 100 of FIG. 6A. The installed part 100 (see FIGS. 6A-6B) has a transferred hole pattern 112 (see FIG. 6B) machined with embodiments of the tool assembly 10 (see FIGS. 2B, 4B), the system 80 (see FIGS. 5A-5C), and the method 150 (see FIG. 7) of the disclosure.

As shown in FIGS. 6A-6B, the installed part 100 is installed between a first beam 104 and a second beam 106 of the mid-body section 102 of the fuselage 202. As further shown in FIGS. 6A-6B, the installed part 100 has a fitting 108 with the transferred hole pattern 112 (see FIG. 6B), and has attachment pieces 110 and positioning pins 82 to secure the installed part 100. The installed part 100 (see FIGS. 6A-6B) comprises the second structure 26, such as the drilled target part 26b, with the second structure pattern 16b of second structure holes 18b (see FIG. 6B) having the locations 12 and the dimensions 14 of the pattern (see FIG. 4C) of the first structure 24 (see FIG. 4C) transferred by the tool assembly 10 (see FIGS. 4A-4B).

Figure 7:
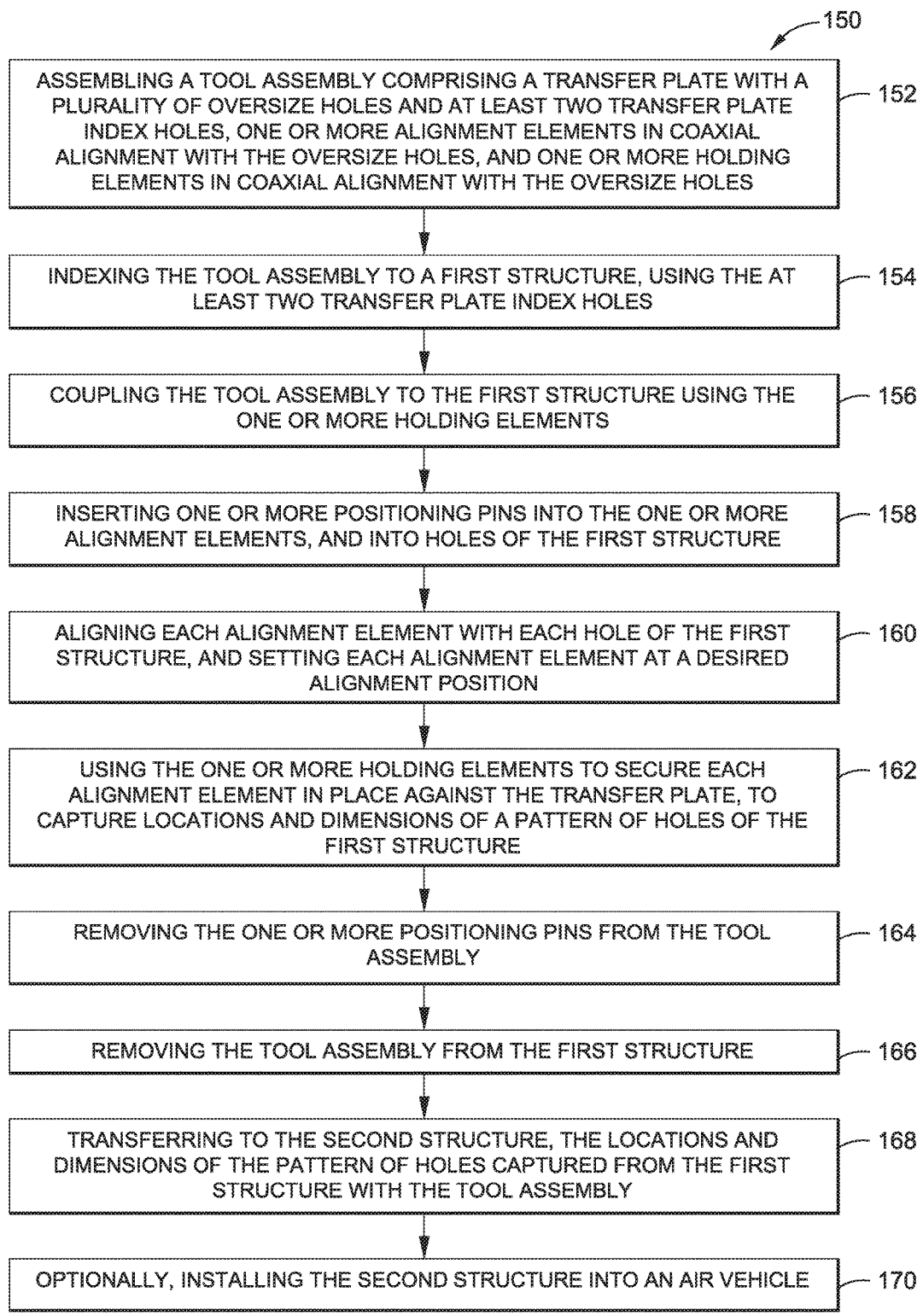
FIG. 7 is an illustration of an exemplary flowchart showing a method for transferring locations and dimensions of a pattern of holes from a first structure to a second structure.

Now referring to FIG. 7, in another embodiment of the disclosure, there is provided a method 150 for transferring locations 12 (see FIGS. 1, 4C) and dimensions 14 (see FIGS. 1, 4C) of the pattern 16 (see FIGS. 1, 4C) of holes 18 (see FIGS. 1, 4C) from the first structure 24 (see FIGS. 1, 4C) to the second structure 26 (see FIGS. 3A-3B, 4D-4E). FIG. 7 is an illustration of an exemplary flowchart showing the method 150 for transferring the locations 12 and dimensions 14 of the pattern 16 of holes 18 from the first structure 24 to the second structure 26.

As shown in FIG. 7, the method 150 comprises step 152 of assembling the tool assembly 10 (see FIGS. 2A-2B, 4A-4B). As discussed in detail above, the tool assembly 10 (see FIGS. 2A-2B, 4A-4B) comprises the transfer plate 30 (see FIGS. 2A, 4A) having the transfer plate pattern 16a (see FIGS. 2A, 4A) of transfer plate holes 18a (see FIGS. 2A, 4A) formed through the transfer plate 30 (see FIGS. 2A, 4A). The transfer plate holes 18a (see FIGS. 2A, 4A) comprise a plurality of oversize holes 20 (see FIGS. 2A, 4A). The transfer plate 30 (see FIGS. 2A, 4A) further comprises at least two transfer plate index holes 22a (see FIGS. 2A, 4A). The transfer plate pattern 16a (see FIGS. 2A, 4A) is substantially identical to the pattern 16 (see FIGS. 1, 4C) in the first structure 24 (see FIGS. 1, 4C). The transfer plate 30 (see FIGS. 2A, 4A) is initially designed and then fabricated or machined using known fabrication or machining devices that form the transfer plate holes 18a (see FIGS. 2A, 4A) and the transfer plate index holes 22a (see FIGS. 2A, 4A).

As discussed in detail above, the tool assembly 10 (see FIGS. 2A-2B, 4A-4B) further comprises one or more alignment elements 40 (see FIGS. 2B, 4B) installed in the plurality of oversize holes 20 (see FIGS. 2B, 4B). Each alignment element 40 (see FIGS. 2B, 4B) has a through opening 50 (see FIGS. 2B, 4B) in a coaxial alignment 28 (see FIGS. 2B, 4B) with the oversize hole 20 (see FIGS. 2B, 4B). The oversize hole 20 (see FIGS. 2B, 4B) forms the alignment variation gap 56 (see FIGS. 2B, 4B) between the exterior 54 (see FIGS. 2B, 4B) of the alignment element 40 (see FIGS. 2B, 4B) and the inner wall 37 (see FIGS. 2B, 4B) of the oversize hole 20 (see FIGS. 2B, 4B). The step 152 (see FIG. 7) of assembling the tool assembly 10 (see FIGS. 2B, 4B) further comprises assembling the tool assembly 10 with the one or more alignment elements 40 (see FIGS. 2B, 4B) each comprising a floating bushing 40a (see FIGS. 2B, 4B).

As discussed in detail above, the tool assembly 10 (see FIGS. 2A-2B, 4A-4B) further comprises one or more holding elements 60 (see FIGS. 2B, 4B) coupled to the transfer plate 30 (see FIGS. 2B, 4B). Each holding element 60 (see FIGS. 2B, 4B) has the central through opening 76 (see FIGS. 2B, 4B) in coaxial alignment 28 (see FIGS. 2B, 4B) with the oversize hole 20 (see FIGS. 2B, 4B) of the transfer plate 30 (see FIGS. 2B, 4B) and with the through opening 50 (see FIGS. 2B, 4B) of the alignment element 40 (see FIGS. 2B, 4B). The step 152 (see FIG. 7) of assembling the tool assembly 10 (see FIGS. 2B, 4B) further comprises assembling the tool assembly 10 with the one or more holding elements 60 (see FIGS. 2B, 4B) each comprising a clamp bushing 60a (see FIGS. 2B, 4B). However, the holding element 60 may also be in the form of a locking device such as a lever lock device, or another suitable holding, clamping, or locking element.

As shown in FIG. 7, the method 150 further comprises step 154 of indexing the tool assembly 10 (see FIGS. 2B, 4B) to the first structure 24 (see FIGS. 1, 4C), using the at least two transfer plate index holes 22a (see FIGS. 2A, 4A) aligned with at least two substantially identical corresponding first structure index holes 22 (see FIGS. 1, 4C) formed in the first structure 24 (see FIGS. 1, 4C). The first structure 24 (see FIGS. 1, 4C) is initially designed and then fabricated or machined using known fabrication or machining devices that form the holes 18 (see FIG. 1) and the first structure index holes 22 (see FIG. 1) in the first structure 24 (see FIG. 1).

As shown in FIG. 7, the method 150 further comprises step 156 of coupling the tool assembly 10 (see FIGS. 2B, 4B) to the first structure 24 (see FIGS. 1, 4C) using the one or more holding elements 60 (see FIGS. 2B, 4B). As shown in FIG. 7, the method 150 further comprises step 158 of inserting one or more positioning pins 82 (see FIGS. 5A-5C) into the one or more alignment elements 40 (see FIGS. 5A-5C) of the tool assembly 10 (see FIGS. 5A-5C), and into the holes 18 (see FIGS. 5A-5C) of the first structure 24 (see FIGS. 5A-5C).

As shown in FIG. 7, the method 150 further comprises step 160 of aligning each alignment element 40 (see FIGS. 2B, 4B) with each hole 18 (see FIGS. 1, 4C) of the first structure 24 (see FIGS. 1, 4C), and setting each alignment element 40 (see FIGS. 2B, 4B) at a desired alignment position 96 (see FIGS. 5A-5C).

As shown in FIG. 7, the method 150 further comprises step 162 of using the one or more holding elements 60 (see FIGS. 2B, 4B) to secure each alignment element 40 in place against the transfer plate 30 (see FIGS. 2B, 4B), to capture the locations 12 (see FIGS. 1, 4C) and the dimensions 14 (see FIGS. 1, 4C) of the pattern 16 (see FIGS. 1, 4C) of holes 18 (see FIGS. 1, 4C) of the first structure 24 (see FIGS. 1, 4C). Each of the holding elements 60 (see FIGS. 2B, 4B, such as in the form of clamp bushings 60a (see FIGS. 2B, 4B) is tightened around each transfer plate threaded portion 38 (see FIGS. 2B, 4B).

As shown in FIG. 7, the method 150 further comprises step 164 of removing the one or more positioning pins 82 (see FIGS. 5A-5C) from the tool assembly 10 (see FIGS. 5A-5C). As shown in FIG. 7, the method 150 further comprises step 166 of removing the tool assembly 10 (see FIGS. 5A-5C) from the first structure 24 (see FIGS. 5A-5C).

As shown in FIG. 7, the method 150 further comprises step 168 of transferring to the second structure 26 (see FIGS. 3A-3B, 4D-4E), the locations 12 (see FIGS. 1, 4C) and the dimensions 14 (see FIGS. 1, 4C) of the pattern 16 (see FIGS. 1, 4C) of holes 18 (see FIGS. 1, 4C) captured from the first structure 24 (see FIGS. 1, 4C) with the tool assembly 10 (see FIGS. 2B, 4B). The step 168 (see FIG. 7) of transferring the locations 12 (see FIGS. 1, 4C) and the dimensions 14 (see FIGS. 1, 4C) of the pattern 16 (see FIGS. 1, 4C) of holes 18 (see FIGS. 1, 4C) from the first structure 24 (see FIGS. 1, 4C) to the second structure 26 (see FIGS. 3A-3C, 4D-4E) may further comprise initially indexing the tool assembly 10 to the second structure 26 (see FIGS. 3A-3B, 4D-4E) using the at least two transfer plate index holes 22a (see FIGS. 2A, 4A) aligned with at least two substantially identical corresponding second structure index holes 22b (see FIGS. 3A-3B, 4D-4E) in the second structure 26 (see FIGS. 3A-3B, 4D-4E).

The step 168 (see FIG. 7) of transferring the locations 12 (see FIGS. 1, 4C) and the dimensions 14 (see FIGS. 1, 4C) of the pattern 16 (see FIGS. 1, 4C) of holes 18 (see FIGS. 1, 4C) from the first structure 24 (see FIGS. 1, 4C) to the second structure 26 (see FIGS. 3A-3B, 4D-4E) may further comprise drilling with a drilling apparatus 114 (see FIGS. 3A, 4D) the second structure pattern 16b (see FIGS. 3B, 4E) of second structure holes 18b (see FIGS. 3B, 4E) in the second structure 26 (see FIGS. 3B, 4E), that is substantially identical to the pattern 16 (see FIGS. 1, 4C) of holes 18 (see FIGS. 1, 4C) captured and transferred from the first structure 24 (see FIGS. 1, 4C) with the tool assembly 10 (see FIGS. 1, 4C). The second structure 26 (see FIGS. 3A, 4D), such as the blank target part 26a (see FIG. 3A) and blank target part 26c (see FIG. 4D) is initially designed and then fabricated or machined using known fabrication or machining devices that form second structure index holes 22b (see FIGS. 3A, 4D) in the second structure 26 (see FIGS. 3A, 4D).

With the step 168 (see FIG. 7) of transferring the locations 12 (see FIGS. 1, 4C) and the dimensions 14 (see FIGS. 1, 4C) of the pattern 16 (see FIGS. 1, 4C) of holes 18 (see FIGS. 1, 4C) from the first structure 24 (see FIGS. 1, 4C) to the second structure 26 (see FIGS. 3A-3B, 4D-4E), the tool assembly 10 (see FIGS. 5A-5C) in the alignment position 96 (see FIGS. 5A-5C) and without the positioning pins 82 (see FIGS. 5A-5C), is secured to the second structure 26 (see FIGS. 3A, 4D), such as the blank target part 26a (see FIG. 3A) and blank target part 26c (see FIG. 3F), and both are secured to the drilling apparatus 114 (see FIGS. 3A, 4D), such as a manual drill, a milling machine, a CNC (computer numeric control) automated machine, or another suitable drilling machine, 3-axis machine, or milling machine. The transfer plate pattern 16a of transfer plate holes 18a is then drilled and transferred with the drilling apparatus 114 (see FIGS. 3A, 4D) into the blank target part 26a (see FIG. 3A) or blank target part 26c (see FIG. 4D), to obtain the drilled target part 26b (see FIG. 3B) or the drilled target part 26d (see FIG. 4E), respectively, with the second structure pattern 16b (see FIGS. 3B, 4E) of second structure holes 18b (see FIGS. 3B, 4E) in the second structure 26 (see FIGS. 3B, 4E), that is substantially identical to the pattern 16 (see FIGS. 1, 4C) of holes 18 (see FIGS. 1, 4C) of the first structure 24 (see FIGS. 1, 4C) and identical, or substantially identical, to the transfer plate pattern 16a (see FIGS. 2A, 4A) of transfer plate holes 18a (see FIGS. 2A, 4A).

The drilled target part 26b (see FIG. 3B) or the drilled target part 26d (see FIG. 4E) and the tool assembly 10 are then removed from the drilling apparatus 114 (see FIGS. 3A, 4D) after drilling is completed. The second structure pattern 16b (see FIGS. 3B, 4E) of second structure holes 18b (see FIGS. 3B, 4E) may then be compared to and inspected against the pattern 16 (see FIGS. 1, 4C) of holes 18 (see FIGS. 1, 4C) of the first structure 24 (see FIGS. 1, 4C), and any clearance may be measured through each mating second structure hole 18b (see FIGS. 3B, 4E) and hole 18 (see FIGS. 1, 4C) of the first structure 24 (see FIGS. 1, 4C).

Figure 8:
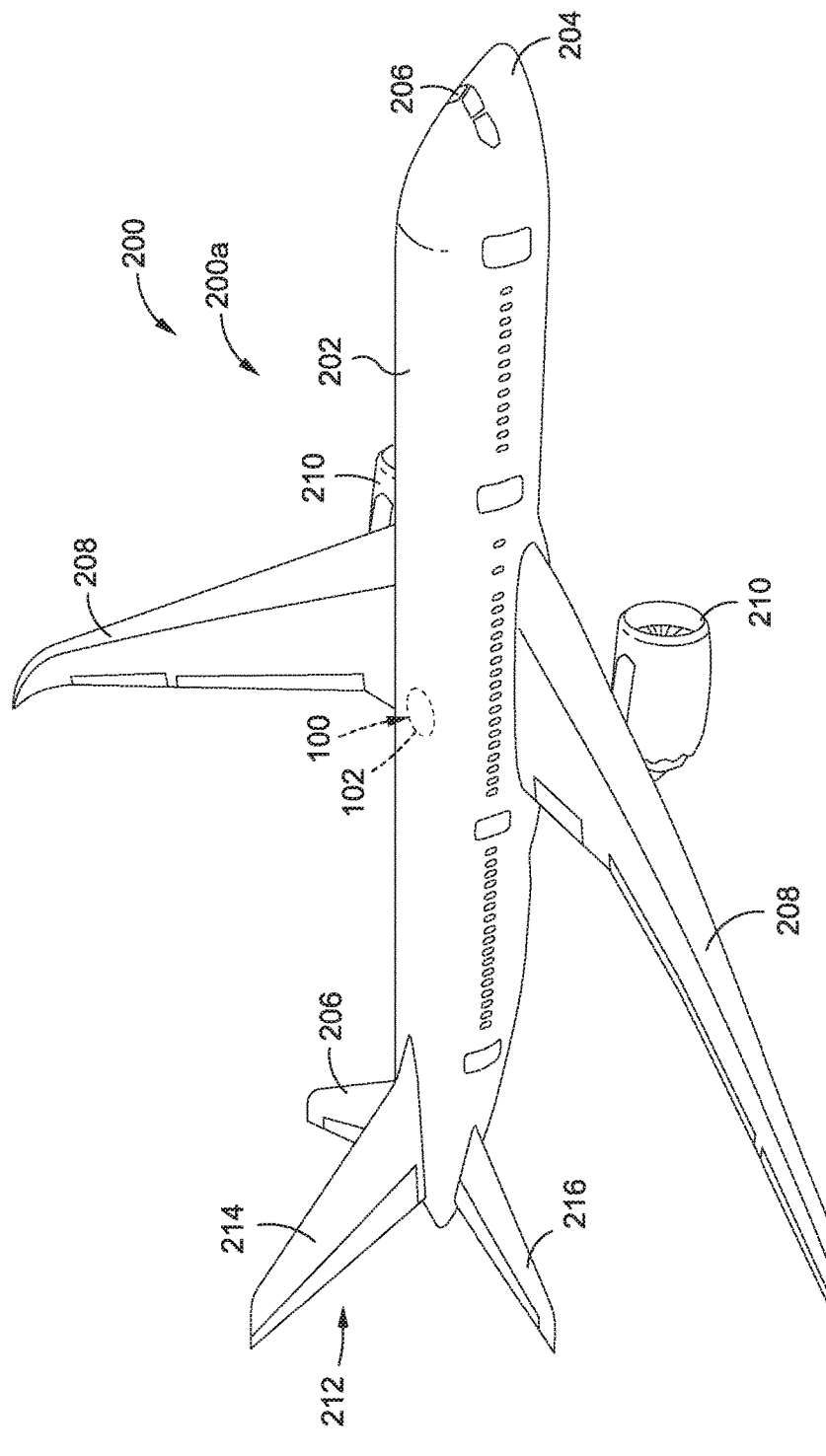
FIG. 8 is an illustration of a perspective view of an air vehicle that incorporates one or more installed parts machined using embodiments of a tool assembly, system, and method of the disclosure.

As shown in FIG. 7, the method 150 may further optionally comprise after the step 168 of transferring the locations 12 (see FIGS. 1, 4C) and the dimensions 14 (see FIGS. 1, 4C) of the pattern 16 (see FIGS. 1, 4C) of holes 18 (see FIGS. 1, 4C) from the first structure 24 (see FIGS. 1, 4C) to the second structure 26 (see FIGS. 3A-3B, 4D-4E), step 170 of installing the drilled second structure 26 (see FIGS. 3A-3B, 4D-4E) into an air vehicle 200 (see FIG. 8) comprising an aircraft 200a (see FIG. 8).

Now referring to FIG. 8, FIG. 8 is an illustration of a perspective view of an air vehicle 200, such as in the form of aircraft 200a, that incorporates one or more installed parts 100 comprising the second structure 26 (see FIGS. 3B, 4E), such as in the form of drilled target part 26b (see FIG. 3B), and machined using embodiments of the tool assembly 10 (see FIGS. 2B, 4B), the system 80 (see FIGS. 5A-5C), and the method 150 (see FIG. 7) of the disclosure.

As shown in FIG. 8, the air vehicle 200, such as in the form of aircraft 200a, comprises a fuselage 202, a nose 204, a cockpit 2016, wings 208, engines 210, and an empennage 212 comprising horizontal stabilizers 214 and a vertical stabilizer 216. As further shown in FIG. 8, the air vehicle 200, such as in the form of aircraft 200a, comprises one or more installed parts 100, such as installed in the mid-body section 102 of the fuselage 202 of the air vehicle 200. The installed parts 100 may also be installed in the wings 208, or another suitable section of the air vehicle 200, such as in the form of aircraft 200*a*.

Figure 9:
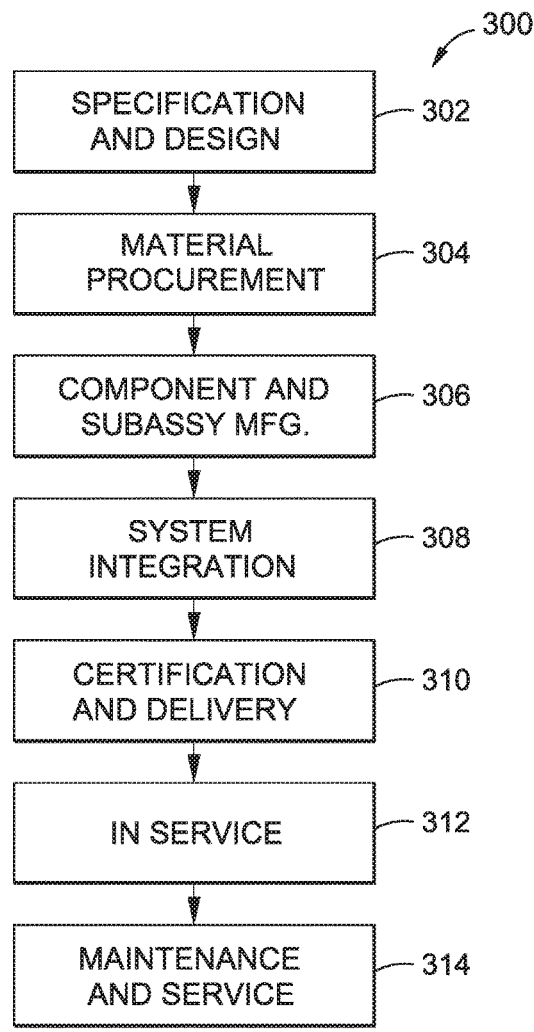
FIG. 9 is an illustration of a flow diagram of an exemplary aircraft manufacturing and service method.
Figure 10:
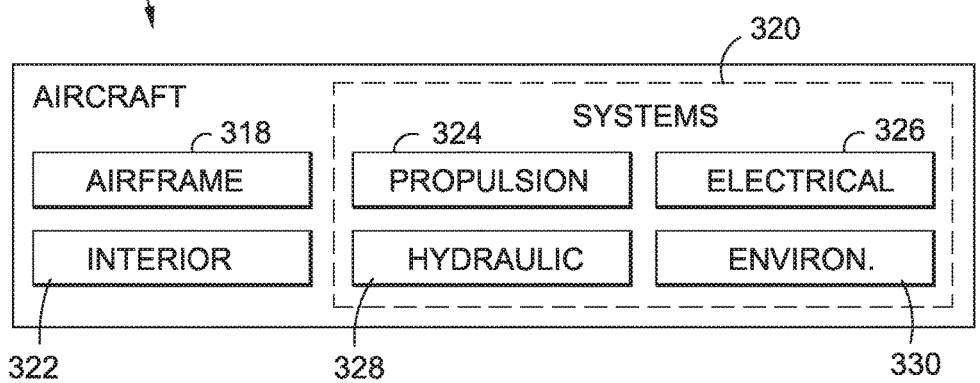
FIG. 10 is an illustration of an exemplary block diagram of an aircraft.

Referring now to FIGS. 9 and 10, FIG. 9 is an illustration of a flow diagram of an exemplary aircraft manufacturing and service method 300, and FIG. 10 is an illustration of an exemplary block diagram of an aircraft 316. Referring to FIGS. 9-10, embodiments of the disclosure may be described in the context of the aircraft manufacturing and service method 300 as shown in FIG. 9, and the aircraft 316 as shown in FIG. 10.

During pre-production, exemplary aircraft manufacturing and service method 300 may include specification and design 302 of the aircraft 316 and material procurement 304. During manufacturing, component and subassembly manufacturing 306 and system integration 308 of the aircraft 316 takes place. Thereafter, the aircraft 316 may go through certification and delivery 310 in order to be placed in service 312. While in service 312 by a customer, the aircraft 316 may be scheduled for routine maintenance and service 314 (which may also include modification, reconfiguration, refurbishment, and other suitable services).

Each of the processes of the aircraft manufacturing and service method 300 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 10, the aircraft 316 produced by the exemplary aircraft manufacturing and service method 300 may include an airframe 318 with a plurality of systems 320 and an interior 322. Examples of the plurality of systems 320 may include one or more of a propulsion system 324, an electrical system 326, a hydraulic system 328, and an environmental system 330. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 300. For example, components or subassemblies corresponding to component and subassembly manufacturing 306 may be fabricated or manufactured in a manner similar to components or subassemblies produced while the aircraft 316 is in service 312. Also, one or more apparatus embodiments, method embodiments, or a combination thereof, may be utilized during component and subassembly manufacturing 306 and system integration 308, for example, by substantially expediting assembly of or reducing the cost of the aircraft 316. Similarly, one or more of apparatus embodiments, method embodiments, or a combination thereof, may be utilized while the aircraft 316 is in service 312, for example and without limitation, to maintenance and service 314.

Disclosed embodiments of the tool assembly 10 (see FIGS. 2B, 4B), the system 80 (see FIGS. 5A-5C), and the method 150 (see FIG. 7), provide for a tool assembly 10 (see FIGS. 2A-2B, 4A-4B) that is used to capture the locations 12 (see FIGS. 1, 4C) and the dimensions 14 (see FIGS. 1, 4C) of the pattern 16 (see FIGS. 1, 4C) of holes 18 (see FIGS. 1, 4C), and holes 18 (see FIGS. 1, 4C), of a first structure 24 (see FIGS. 1, 4C) for the purpose of transferring the locations 12 (see FIGS. 1, 4C) and the dimensions 14 (see FIGS. 1, 4C) to a second structure 26 (see FIGS. 3A-3B, 4D-4E), or mating part. The tool assembly 10 (see FIGS. 2A-2B, 4A-4B) utilizes a design in which one or more alignment elements 40 (see FIGS. 2B, 4B), such as in the form of floating bushings 40*a* (see FIGS. 2B, 4B), can float or move side to side to be located coaxial to the hole 18 (see FIGS. 1, 4C) in the first structure 24 (see FIGS. 1, 4C). The alignment positions 96 (see FIGS. 5A-5C) of the one or more alignment elements 40 (see FIGS. 5A-5C), such as in the form of floating bushings 40*a* (see FIG. 5A-5B), can then be captured, and transferred to the second structure 26 (see FIGS. 3A-3B, 4D-4E), such as the blank target part 26*a* (see FIG. 3A) or blank target part 26*c* (see FIG. 4D), and transfer drilled to obtain the drilled target part 26*b* (see FIG. 3B) or drilled target part 26*d* (see FIG. 4E). The tool assembly 10 (see FIGS. 2A-2B, 4A-4B) functions as an adjustable drill template which can be configured to conform to a plurality of different hole patterns.

In addition, disclosed embodiments of the tool assembly 10 (see FIGS. 2B, 4B), the system 80 (see FIGS. 5A-5C), and the method 150 (see FIG. 7), provide for capture and transfer of drill precision hole patterns with a tight positional tolerance from a first structure 24 (see FIGS. 1, 4C) to a second structure 26 (see FIGS. 3A-3B, 4D-4E), and utilize the tool assembly 10 (see FIGS. 2B, 4B) to capture and transfer the precise locations 12 (see FIGS. 1, 4C) and the dimensions 14 (see FIGS. 1, 4C) of the pattern 16 (see FIGS. 1, 4C) of holes 18 (see FIGS. 1, 4C) on the first structure 14 (see FIGS. 1, 4C), and then allows for off the assembly line or off the aircraft drilling or machining, of the captured pattern 16 (see FIGS. 1, 4C) of holes 18 (see FIGS. 1, 4C), into the second structure 26 (see FIGS. 3A-3B, 4D-4E), as opposed to requiring match drilling processes on the aircraft 200*a* (see FIG. 8) during assembly of the aircraft.

Disclosed embodiments of the tool assembly 10 (see FIGS. 2B, 4B), the system 80 (see FIGS. 5A-5C), and the method 150 (see FIG. 7), avoid the use of known manual or computerized coordinate measuring machines (CMMs), which may require expensive equipment, specialized software, and trained technicians to operate and to analyze the measurement results, and thus, use of the tool assembly 10 (see FIGS. 2B, 4B), the system 80 (see FIGS. 5A-5C), and the method 150 (see FIG. 7) may result in decreased complexity, time, and cost of manufacture or assembly of the structure or part. Further, the tool assembly 10 (see FIGS. 2B, 4B), the system 80 (see FIGS. 5A-5C), and the method 150 (see FIG. 7), avoid the use of known CMMs which may require evacuating assembly workers off the aircraft during operation of the CMM in order to maintain a stable test environment to obtain the measurements, and thus, use of the tool assembly 10 (see FIGS. 2B, 4B), the system 80 (see FIGS. 5A-5C), and the method 150 (see FIG. 7) avoid increased setup time and operation, and may, in turn, result in decreased time and cost of manufacture or assembly of the structure or part. Further, disclosed embodiments of the tool assembly 10 (see FIGS. 2B, 4B), the system 80 (see FIGS. 5A-5C), and the method 150 (see FIG. 7), may remove or minimize ergonomic issues for drill operators on the aircraft 200*a* (see FIG. 8), by avoiding or minimizing subfloor drilling, and with use of the tool assembly 10 (see FIGS. 2B, 4B), the system 80 (see FIGS. 5A-5C), and the method 150 (see FIG. 7), drilling may be performed offline or off of the aircraft 200*a* (see FIG. 8) in a shop or machining environment or facility.

Moreover, disclosed embodiments of the tool assembly 10 (see FIGS. 2B, 4B), the system 80 (see FIGS. 5A-5C), and the method 150 (see FIG. 7), provide a simple, easy to use, and quick design using one or more alignment elements 40 (see FIGS. 2B, 4B), such as in the form of floating bushings 40*a* (see FIGS. 2B, 4B), that are configured to float or move, and may remove or reduce drilling on the aircraft, which in turn, may lead to reduced manufacturing and assembly costs, and significant reduction of flow time on the factory, assembly, or manufacturing floor, for example, a reduction from six (6) days, or more, with known devices, systems, and methods to one (1) to three (3) days using the tool assembly 10 (see FIGS. 2B, 4B), the system 80 (see FIGS. 5A-5C), and the method 150 (see FIG. 7) disclosed herein. In addition, disclosed embodiments of the tool assembly 10 (see FIGS. 2B, 4B), the system 80 (see FIGS. 5A-5C), and the method 150 (see FIG. 7), provide for a quick and easy validation process for any misalignment, as no rescheduling for misalignment is required, quick removal and installation of the tool assembly 10 (see FIGS. 2B, 4B) may be performed, and misalignment validation may be performed off the assembly line and off the aircraft 200*a* (see FIG. 8).

Further, disclosed embodiments of the tool assembly 10 (see FIGS. 2B, 4B), the system 80 (see FIGS. 5A-5C), and the method 150 (see FIG. 7), may reduce the cost of parts, and in particular, tight positional tolerance parts, as suppliers may no longer have to meet significantly tight positional tolerances in their parts. The higher the positional tolerances are, the more expensive the part becomes. If the positional tolerances are relaxed and the tool assembly 10 (see FIGS. 2B, 4B) is used to catch any variations in positional tolerance, the cost of a part may be reduced at the beginning of the manufacturing or assembly process by not having to be held to such tight positional tolerances.

In addition, disclosed embodiments of the tool assembly 10 (see FIGS. 2B, 4B), the system 80 (see FIGS. 5A-5C), and the method 150 (see FIG. 7), provide a means of coaxial or concentric location hole transfer of the locations 12 (see FIGS. 1, 4C) and the dimensions 14 (see FIGS. 1, 4C) of the pattern 16 (see FIGS. 1, 4C) of holes 18 (see FIGS. 1, 4C) from the first structure 24 (see FIGS. 1, 4C) to the second structure 26 (see FIGS. 3A-3B, 4D-4E), regardless of positional tolerance factors. Functionally, the tool assembly 10 (see FIGS. 2B, 4B) provides the transfer plate 30 (see FIGS. 2B, 4B) in which the locations 12 (see FIGS. 1, 4C) and the dimensions 14 (see FIGS. 1, 4C) of alignment elements 40 (see FIGS. 2B, 4B), such as in the form of floating bushings 40*a* (see FIGS. 2B, 4B), for two or more drill locations have been located and drilled at an optimal centerline axis coaxial alignment 28*a* (see FIGS. 5A-5C). In use, a specific diametric dimensional tolerance range related to coaxial or concentricity axis variation in location to the pattern 16 (see FIGS. 1, 4C) of holes 18 (see FIGS. 1, 4C) is determined. Predetermined specific oversize holes 20 (see FIGS. 2A, 4A) are machined at each drilled location 12 (see FIGS. 5A-5C) where the oversize holes 20 (see FIGS. 2A, 4A) allow for an alignment variation gap 56 (see FIGS. 2B, 4B) of the alignment elements 40 (see FIGS. 2B, 4B) assembled within the transfer plate 30 (see FIGS. 2A, 4A). Moreover, the tool assembly 10 (see FIGS. 2B, 4B) may be used as either a hole transfer drill jig assembly 11 (see FIGS. 2A, 4A) or as a clamp up jig for temporary clamping together of parts.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A tool assembly for transferring locations and dimensions of a pattern of holes from a first structure to a second structure, the tool assembly comprising:
   a transfer plate having a transfer plate pattern of transfer plate holes formed through the transfer plate, the transfer plate holes comprising a plurality of oversize holes and at least two transfer plate index holes, the transfer plate pattern being substantially identical to the pattern in the first structure;
   one or more alignment elements installed in the plurality of oversize holes, each alignment element having a through opening in a coaxial alignment with the oversize hole, the oversize hole allowing formation of an alignment variation gap between an exterior of the alignment element and an inner wall of the oversize hole; and
   one or more holding elements coupled to the transfer plate, each holding element having a central through opening in coaxial alignment with the oversize hole of the transfer plate and the through opening of the alignment element,
   wherein when the tool assembly is coupled to the first structure and a positioning pin is inserted into each through opening of the one or more alignment elements and into each hole of the first structure, the one or more holding elements hold the one or more alignment elements in place against the transfer plate, and the one or more alignment elements are each set at a desired alignment position to capture the locations and the dimensions of the pattern of holes and to provide transfer of the locations and the dimensions of the pattern of holes from the first structure to the second structure.

2. The tool assembly of claim 1 wherein the one or more alignment elements each comprises a floating bushing.

3. The tool assembly of claim 1 wherein the one or more alignment elements each comprises a body member inserted within the oversize hole, and a flange portion coupled between the transfer plate and the holding element, when the alignment element is in the desired alignment position.

4. The tool assembly of claim 1 wherein the one or more holding elements each comprises a clamp bushing.

5. The tool assembly of claim 1 wherein the one or more holding elements each comprises a body portion with a threaded portion, and a cap portion configured to hold the alignment element in place, when the alignment element is in the desired alignment position.

6. The tool assembly of claim 5 wherein the transfer plate has one or more transfer plate threaded portions, each configured for coupling to the threaded portion of the holding element.

7. The tool assembly of claim 1 wherein the transfer plate comprises one of, an open-ended transfer plate, a closed-ended transfer plate with interior threads, and a closed-ended transfer plate with exterior threads.

8. The tool assembly of claim 1 wherein the at least two transfer plate index holes of the transfer plate are substantially identical to at least two corresponding first structure index holes in the first structure, and to at least two corresponding second structure index holes in the second structure.

9. The tool assembly of claim 1 wherein each oversize hole of the transfer plate has an oversize hole diameter $d_1$ greater than a diameter d3 of the hole in the first structure, and greater than a through opening diameter d2 of the through opening in the alignment element.

10. A system for transferring locations and dimensions of a pattern of holes from a first structure to a second structure, the system comprising:
the first structure having the pattern of holes with the locations and the dimensions;
a tool assembly comprising:
a transfer plate having a transfer plate pattern of transfer plate holes formed through the transfer plate, the transfer plate holes comprising a plurality of oversize holes and at least two transfer plate index holes, the transfer plate pattern being substantially identical to the pattern in the first structure;
one or more alignment elements installed in the plurality of oversize holes, each alignment element having a through opening in a coaxial alignment with the oversize hole, the oversize hole allowing formation of an alignment variation gap between an exterior of the alignment element and an inner wall of the oversize hole; and
one or more holding elements coupled to the transfer plate, each holding element having a central through opening in coaxial alignment with the oversize hole of the transfer plate and the through opening of the alignment element;
one or more positioning pins configured for insertion into each through opening of the one or more alignment elements and into each hole of the first structure; and
the second structure configured for drilling of the locations and the dimensions of the pattern of holes captured and transferred from the first structure with the tool assembly,
wherein when the tool assembly is coupled to the first structure and the one or more positioning pins are inserted into the one or more alignment elements and into the holes of the first structure, the one or more holding elements hold the one or more alignment elements in place against the transfer plate, and the one or more alignment elements are each set at a desired alignment position to capture the locations and the dimensions of the pattern of holes and to provide transfer of the locations and the dimensions of the pattern of holes from the first structure to the second structure.

11. The system of claim 10 wherein the at least two transfer plate index holes of the transfer plate are substantially identical to at least two corresponding first structure index holes in the first structure, and to at least two corresponding second structure index holes in the second structure.

12. The system of claim 10 wherein the one or more alignment elements each comprises a floating bushing.

13. The system of claim 10 wherein the one or more holding elements each comprises a clamp bushing.

14. The system of claim 10 further comprising a drilling apparatus for drilling a second structure pattern of second structure holes in the second structure that are substantially identical to the pattern of holes captured and transferred from the first structure with the tool assembly.

15. A method for transferring locations and dimensions of a pattern of holes from a first structure to a second structure, the method comprising the steps of:
assembling a tool assembly comprising:
a transfer plate having a transfer plate pattern of transfer plate holes formed through the transfer plate, the transfer plate holes comprising a plurality of oversize holes and at least two transfer plate index holes, the transfer plate pattern being substantially identical to the pattern in the first structure;
one or more alignment elements installed in the plurality of oversize holes, each alignment element having a through opening in a coaxial alignment with the oversize hole, the oversize hole allowing formation of an alignment variation gap between an exterior of the alignment element and an inner wall of the oversize hole; and
one or more holding elements coupled to the transfer plate, each holding element having a central through opening in coaxial alignment with the oversize hole of the transfer plate and the through opening of the alignment element;
indexing the tool assembly to the first structure, using the at least two transfer plate index holes aligned with at least two substantially identical corresponding first structure index holes formed in the first structure;
coupling the tool assembly to the first structure using the one or more holding elements;
inserting one or more positioning pins into the one or more alignment elements of the tool assembly, and into the holes of the first structure;
aligning each alignment element with each hole of the first structure, and setting each alignment element at a desired alignment position;
using the one or more holding elements to secure each alignment element in place against the transfer plate, to capture the locations and the dimensions of the pattern of holes of the first structure;
removing the one or more positioning pins from the tool assembly;
removing the tool assembly from the first structure; and
transferring to the second structure, the locations and the dimensions of the pattern of holes captured from the first structure with the tool assembly.

16. The method of claim 15 wherein the assembling the tool assembly further comprises assembling the tool assembly with the one or more alignment elements each comprising a floating bushing.

17. The method of claim 15 wherein the assembling the tool assembly further comprises assembling the tool assembly with the one or more holding elements each comprising a clamp bushing.

18. The method of claim 15 wherein the transferring the locations and the dimensions of the pattern of holes from the first structure to the second structure comprises initially indexing the tool assembly to the second structure using the at least two transfer plate index holes aligned with at least two substantially identical corresponding second structure index holes in the second structure.

19. The method of claim 15 wherein the transferring the locations and the dimensions of the pattern of holes from the first structure to the second structure further comprises drilling with a drilling apparatus a second structure pattern of second structure holes in the second structure that is substantially identical to the pattern of holes captured and transferred from the first structure with the tool assembly.

20. The method of claim 19 further comprising after transferring the locations and the dimensions of the pattern of holes from the first structure to the second structure, installing the drilled second structure into an air vehicle comprising an aircraft.

* * * * *